United States Patent [19]
Johnson et al.

[11] Patent Number: 5,151,989
[45] Date of Patent: Sep. 29, 1992

[54] DIRECTORY CACHE MANAGEMENT IN A DISTRIBUTED DATA PROCESSING SYSTEM

[75] Inventors: Donavon W. Johnson, Georgetown; Amal A. Shaheen-Gouda; Todd A. Smith, both of Austin, all of Tex.

[73] Assignee: International Business Machines Corporation, Armonk, N.Y.

[21] Appl. No.: 14,889

[22] Filed: Feb. 13, 1987

[51] Int. Cl.$^5$ .................... G06F 15/16; G06F 13/00
[52] U.S. Cl. .................................. 395/600; 395/200; 364/222.81; 364/222.82; 364/282.3; 364/284.4; 364/242.94; 364/264; 364/264.5
[58] Field of Search ... 364/200 MS File, 900 MS File; 395/200, 600

[56] References Cited

U.S. PATENT DOCUMENTS 4,558,413 12/1985 Schmidt et al. ..................... 364/300
4,698,766 10/1987 Entwistle et al. ..................... 364/468

OTHER PUBLICATIONS

IEEE Proceedings on the 6th International Conference on Distributed Computing Systems, Cambridge, 19th-23rd May 1986, A. B. Sheltzer et al. "Name Service Locality and Cache Design in a Distributed Operating System", p. 518, column 1, lines 33-46; column 2, lines 1-19; p. 521, column 2, lines 3-39.
"Sun-3 Architecture", A Sun Technical Report, Aug. 1986, pp. 8, 9, 49-57.
Chang, JoMei, "Status Monitor Provides Network Locking Services for NFS", 3 pages.
Chang, JoMei, "SunNet", pp. 71-75.
Taylor, Bradley; Goldberg, David, "Secure Networking in the Sun Environment", pp. 28-36.
IEEE Transactions of Software Engineering, vol. SE-12, No. 11, Nov. 1986, A. B. Sheltzer et al, "Internet Locus: Extending Transparency to an Internet Environment", p. 1067, column 2, lines 22-44; p. 1071, column 2, lines 18-29.
Hamilton, et al.; "An Administrator's View of Remote File Sharing", pp. 1-9.
Houghton, Tom; "File System Switch", 2 pages.
Olander, David J., et al., "A Framework for Networking in System V", pp. 1-8.
Communications of the ACM, vol. 29, No. 3, Mar. 1986, J. H. Morris et al., "Andrew: A Distributed Personal Computing Environment", p. 193, column 2, lines 15-43.
"Method for General Sharing of Data in Hybrid Memory Organization", IBM Technical Disclosure Bulletin, vol. 25, No. 5, Oct. 1982, pp. 2606-2620.
Sandberg et al., "Design and Implementation of the Sun Network Filesystem", pp. 119-130.

(List continued on next page.)

*Primary Examiner*—Eddie P. Chan
*Attorney, Agent, or Firm*—Douglas H. Lefeve

[57] ABSTRACT

An improved directory caching technique is provided for a plurality of data processing systems which are connected together in a network. In the system, when a local, or client, data processing system interrogates a remote, or server, data processing system for a unit of directory information, the server system is enabled to automatically send additional units of pertinent director information back to the client system in response to a subsequent change in the directory structure of the server system. If the server system is unable to continue updating the client system, for any of a plurality of possible reasons, the server system informs the client system of this fact, which enables the client system to purge itself of the formerly stored directory cache entry relative to this path, since the client system can no longer consider this cached path information to be currently correct.

8 Claims, 20 Drawing Sheets

OTHER PUBLICATIONS

Walsh et al., "Overview of the Sun Network File System", pp. 117-124.

Bloom, James M. Dunlap, Kevin J., "Experiences Implementing BIND, A Distributed Name Server for the DARPA Internet", USENIX Association, Summer Conference Proceedings, Atlanta, Ga., Jun. 9-13, 1986, pp. 172-181.

Kleiman, S. R., "Vnodes: An Architecture for Multiple File System Types in Sun UNIX", USENIX Association, Summer Conference Proceedings, Atlanta, Ga., Jun. 9-13, 1986, pp. 238-247.

Rifkin et al., "RFS Architectural Overview", USENIX Association, Summer Conference Proceedings, Atlanta, Ga., Jun. 9-13, pp. 248-259.

2nd International Conference on Distributed Computing Systems, Paris, 8th-10th Apr. 1981, B. Lindsay, "Object Naming and Catalog Management for a Distributed Database Manager", p. 37, column 1, lines 30-0-52; p. 37, column 2, lines 1-19.

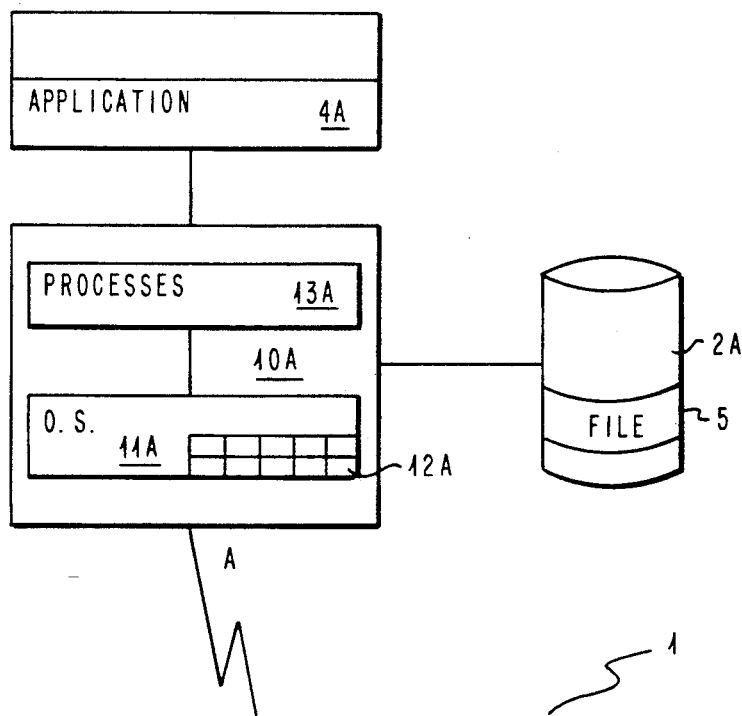
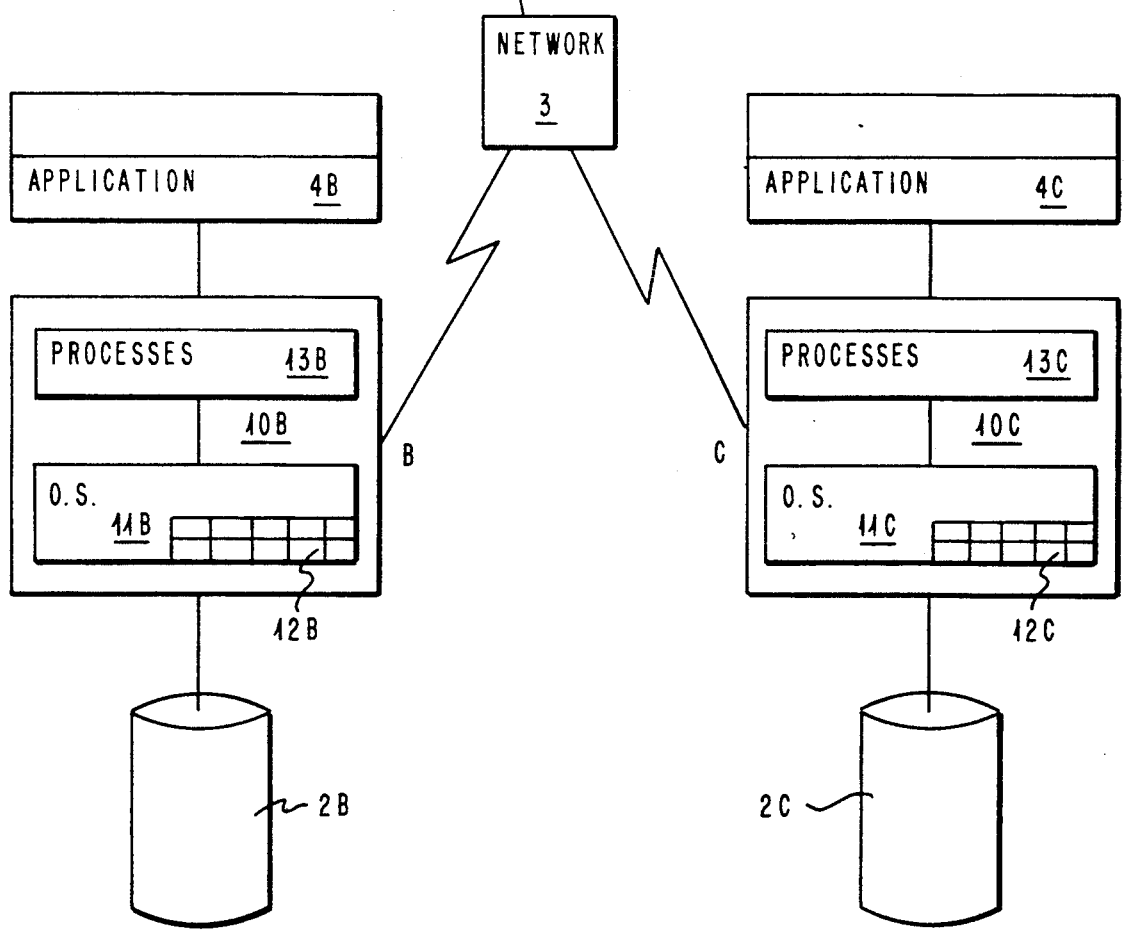
FIG. 7

VFS

VNODE

INODE

FILE ACCESS STRUCTURE

NODE TABLE ENTRY

SURROGATE INODE

| node id | directory file handle | name | file handle |
|---|---|---|---|
| 12 | 401 | source | 330 |
| 20 | 440 | bin | 212 |
| 52 | 890 | docs | 600 |
| 20 | 535 | usr | 440 |
| 12 | 177 | bin | 1000 |
| 12 | 123 | bin | 410 |
| ⋮ | ⋮ | ⋮ | ⋮ |

Directory Cache

FIG. 15

| node id | caching? | other connection information |
|---|---|---|
| 5 | N | ... |
| 20 | Y | ... |
| 52 | Y | ... |
| 9 | N | ... |
| 17 | Y | ... |
| ⋮ | ⋮ | ⋮ |

FIG. 16

Node Table

Executed Each Time a Directory is Updated

Directory Cache Entry

Executed Each Time In Response to a Lookup RPC Request

DIRECTORY CACHE MANAGEMENT IN A DISTRIBUTED DATA PROCESSING SYSTEM

CROSS REFERENCE TO RELATED APPLICATIONS

This application is related in subject matter to the following applications filed concurrently herewith and assigned to a common assignee:

U.S. Pat. No. 4,897,781 filed by A. Chang, G. H. Neuman, A. A. Shaheen-Gouda, and T. A. Smith for A System And Method For Using Cached Data At A Local Node After Re-opening A File At A Remote Node In A Distributed Networking Environment.

Application Ser. No. 07/014,884, now abandoned, filed by D. W. Johnson, L. W. Henson, A. A. Shaheen-Gouda, and T. A. Smith for A System Method for Version Level Negotiation.

U.S. Pat. No. 4,887,204 filed by D. W. Johnson, G. H. Neuman, C. H. Sauer, A. A. Shaheen-Gouda, and T. A. Smith for A System And Method For Accessing Remote Files In A Distributed Networking Environment.

Application Ser. No. 07/014,900, now abandoned, filed by D. W. Johnson, A. A. Shaheen-Gouda, T. A. Smith for Distributed File Access Structure Lock.

Application Ser. No. 07/014,891, now abandoned, filed by L. W. Henson, A. A. Shaheen-Gouda, and T. A. Smith for Distributed File and Record Locking.

U.S. Pat. No. 5,001,628 filed by D. W. Johnson, L. K. Loucks, C. H. Sauer, and T. A. Smith for Single System Image.

Application Ser. No. 07/014,888, now U.S. Pat. No. 5,133,053, filed by D. W. Johnson, L. K. Loucks, A. A. Shaheen-Gouda for Interprocess Communication Queue Location Transparency.

The disclosures of the foregoing co-pending applications are incorporated herein by reference.

DESCRIPTION

TECHNICAL FIELD

This invention generally relates to improvements in operating systems for a distributed data processing system and, more particularly, to an improvement in an operating system for a multi-processor system interconnected by a local area network (LAN) or a wide area network (WAN). The improvement according to the invention provides an increased efficiency in file directory caching for accessing files by processors in the system, regardless of where those files are located in the system.

BACKGROUND ART

This invention is specifically concerned with distributed data processing systems characterized by a plurality of processors interconnected in a network. As actually implemented, the invention runs on a plurality of IBM RT PC[1] interconnected by IBM's Systems Network Architecture (SNA), and more specifically SNA LU 6.2 Advanced Program to Program Communication (APPC). SNA uses as its link level Ethernet[2], a local area network (LAN) developed by Xerox Corp., or SDLC (Synchronous Data Link Control). A simplified description of local area networks including the Ethernet local area network may be found in a book by
[1]RT and RT PC are registered trademarks of IBM Corporation. [2]Ethernet is a trademark of Xerox Corporation. Larry E. Jordan and Bruce Churchill entitled *Communications and Networking for the IBM PC*, published by Robert J. Brady (a Prentice-Hall company) (1983). A more definitive description of communications systems for computers, particularly of SNA and SDLC, is to be found in a book by R. J. Cypser entitled *Communications Architecture for Distributed Systems*, published by Addison-Wesley (1978). It will, however, be understood that the invention may be implemented using other and different computers than the IBM RT PC interconnected by other networks than the Ethernet local area network or IBM's SNA.

As mentioned, the invention to be described hereinafter is directed to a distributed data processing system in a communication network. In this environment, each processor at a node, in the network potentially may access all the files in the network regardless of the nodes at which the files may reside. As shown in FIG. 1, a distributed network environment 1 may consist of two or more nodes A, B and C connected through a communication link or network 3. The network 3 can be a local area network (LAN) as mentioned or a wide area network (WAN), the latter comprising a switched or leased teleprocessing (TP) connection to other nodes or to a SNA network of systems. At any of the nodes A, B or C there may be a processing system 10A, 10B or 10C, such as the aforementioned IBM RT PC. Each of these systems 10A, 10B and 10C may be a single user system or a multi-user system with the ability to use the network 3 to access files located at a remote node in the network. For example, the processing system 10A at local node A is able to access the files 5B and 5C at the remote nodes B and C.

The problems encountered in accessing remote nodes can be better understood by first examining how a standalone system accesses files In a standalone system, such as 10 shown in FIG. 2, a local buffer 12 in the operating system 11 is used to buffer the data transferred between the permanent storage 2, such as a hard file or a disk in a personal computer, and the user address space 14. The local buffer 12 in the operating system 11 is also referred to as a local cache or kernel buffer. For more information on the UNIX[3] operating system kernel, see the book by Brian W. Kernighan and Rob Pike entitled *The Unix Programming Environment*, Prentiss-Hall (1984). A more detailed description of the design of the UNIX operating system is to be found in the book by Maurice J. Bach, *Design of the Unix Operating System*, Prentiss-Hall (1986). The local cache can be best understood in terms of a memory resident disk. The data retains the physical characteristics that it had on disk; however, the information how resides in a medium that lends itself to faster data transfer rates very close to the rates achieved in main system memory.
[3]Developed and licensed by AT&T. UNIX is a registered trademark of AT&T in the U.S.A. and other countries.

In the standalone system, the kernel buffer 12 is identified by blocks 15 which are designated as device number and logical block number within the device. When a read system call 16 is issued, it is issued with a file descriptor of the file 5 and a byte range within the file 5, as shown in step 101 in FIG. 3. The operating system 11 takes this information and converts it to device number and logical block numbers of the device in step 102. Then the operating system 11 reads the cache 12 according to the device number and logical block numbers, step 103.

Any data read from the disk 2 is kept in the cache block 15 until the cache block 15 is needed. Consequently, any successive read requests from an application program 4 that is running on the processing system 10 for the same data previously read from the disk is accessed from the cache 12 and not the disk 2. Reading from the cache is less time consuming than accessing the disk; therefore, by reading from the cache, performance of the application 4 is improved. Obviously, if the data which is to be accessed is not in the cache, then a disk access must be made, but this requirement occurs infrequently.

Similarly, data written from the application 4 is not saved immediately on the disk 2 but is written to the cache 12. This again saves time, improving the performance of the application 4. Modified data blocks in the cache 12 are saved on the disk 2 periodically under the control of the operating system 11.

Use of a cache in a standalone system that utilizes the AIX[4] operating system, which is the environment in which the invention was implemented, improves the overall performance of the system disk and minimizes access time by eliminating the need for successive read and write disk operations.

[4]AIX is a trademark of IBM Corporation.

In the distributed networking environment shown in FIG. 1, there are two ways the processing system 10C in local node C could read the file 5A from node A. In one way, the processing system 10C could copy the whole file 5A and then read it as if it were a local file 5C residing at node C. Reading the file in this way creates a problem if another processing system 10B at node B, for example, modifies the file 5A after the file 5A has been copied at node C. The processing system 10C would not have access to the latest modifications to the file 5A.

Another way for processing system 10C to access a file 5A at node A is to read one block at a time as the processing system at node C requires it. A problem with this method is that every read has to go across the network communications link 3 to the node A where the file resides. Sending the data for every successive read is time consuming.

Accessing files across a network presents two competing problems as illustrated above. One problem involves the time required to transmit data across the network for successive reads and writes. On the other hand, if the file data is stored in the node to reduce network traffic, the file integrity may be lost. For example, if one of the several nodes is also writing to the file, the other nodes accessing the file may not be accessing the latest updated file that has just been written. As such, the file integrity is lost, and a node may be accessing incorrect and outdated files. Within this document, the term "server" will be used to indicate the processing system where the file is permanently stored, and the term client will be used to mean any other processing system having processes accessing the file. The invention to be described hereinafter is part of an operating system which provides a solution to the problem of managing distributed information.

Other approaches to supporting a distributed data processing system in a UNIX operating system environment are known. For example, Sun Microsystems has released a Network File System (NFS) and Bell Laboratories has developed a Remote File System (RFS). The Sun Microsystems NFS has been described in a series of publications including S. R. Kleiman, "Vnodes: An Architecture for Multiple File System Types in Sun UNIX", *Conference Proceedings, USENIX 1986 Summer Technical Conference and Exhibition*, pp. 238 to 247; Russel Sandberg et al., "Design and Implementation of the Sun Network Filesystem", *Conference Proceedings, Usenix* 1985, pp. 119 to 130; Dan Walsh et al., "Overview of the Sun Network File System", pp. 117 to 124; JoMei Chang, "Status Monitor Provides Network Locking Service for NFS"; JoMei Chang, "SunNet", pp. 71 to 75; and Bradley Taylor, "Secure Networking in the Sun Environment", pp. 28 to 36. The AT&T RFS has also been described in a series of publications including Andrew P. Rifkin et al., "RFS Architectural Overview", USENIX Conference Proceedings, Atlanta, Ga. (June 1986), pp. 1 to 12; Richard Hamilton et al., "An Administrator's View of Remote File Sharing", pp. 1 to 9; Tom Houghton et al., "File Systems Switch", pp. 1 to 2; and David J. Olander et al., "A Framework for Networking in System V", pp. 1 to 8.

One feature of the distributed services system in which the subject invention is implemented which distinguishes it from the Sun Microsystems NFS, for example, is that Sun's approach was to design what is essentially a stateless machine. More specifically, the server in a distributed system may be designed to be stateless. This means that the server does not store any information about client nodes, including such information as which client nodes have a server file open, whether client processes have a file open in read_ only or read_ write modes, or whether a client has locks placed on byte ranges of the file. Such an implementation simplifies the design of the server because the server does not have to deal with error recovery situations which may arise when a client fails or goes off-line without properly informing the server that it is releasing its claim on server resources. An entirely different approach was taken in the design of the distributed services system in which the present invention is implemented. More specifically, the distributed services system may be characterized as a "statefull implementation".

A "statefull" server, such as that described here, does keep information about who is using its files and how the files are being used. This requires that the server have some way to detect the loss of contact with a client so that accumulated state information about that client can be discarded. The cache management strategies described here, however, cannot be implemented unless the server keeps such state information. The management of the cache is affected, as described below, by the number of client nodes which have issued requests to open a server file and the read/write modes of those opens.

More specifically, because file path name resolution is so frequent, it is important that it be done efficiently. Each system call that uses a file name, for example mount or open, can require that a directory be read and searched for each component of the file name's path. The performance penalties of reading numerous directories each time a file name is used are even more serious in a distributed environment where some of the directories may be in remote nodes.

Some UNIX TM implementations cache directory entries each time they are used in resolving a file's name. Subsequent file name resolution on the same file or files with names that have path pieces in common with the previously cached entries will run faster because directory entries can be found in the cache. Finding directory entries in the cache is faster than reading and searching directories because: (1), the directory cache is a special data structure maintained by the operating system that is optimized for searching; (2), the cache is kept in memory while the directories need to be read from the file system; and (3), the cache will usually have only a limited number of entries to be examined. The directory cache holds the most recently used, and hence the most likely to be useful, directory entries.

There are two major problems that the operating system faces in using a directory cache. The contents of the cache must be kept consistent with the contents of the directories, and the cache must be kept from getting too big. It is important that the cache be kept consistent. If the directory cache indicates that a file's inode number is, say, 45 but the directory has been changed, perhaps due to a mv command, so that the file's real inode number is 62, attempts to resolve the file's name will resolve to the wrong file—an open could open a file different than the one that was specified. If the cache is allowed to grow arbitrarily, it will eventually be so large that the time required to search it will negatively affect performance.

In a stand-alone system, the operating system itself is responsible for all changes to directories, making it possible for the operating system to purge from the directory cache any entries that may have changed, thus always leaving the directory cache with consistent entries. When the cache becomes full, some entries can be purged to make room for new entries. The choice of entries to purge to make room is not critical, but performance will usually be least impacted if the most recently used entries are retained. Since the major problems of directory caching can be handled in this fashion for stand-alone systems, several stand-alone UNIX TM implementations including stand-alone AIX TM do directory caching.

The solutions available for stand-alone systems do not work in a distributed environment. The directory cache is maintained by client nodes, while changes to directories in other, server, nodes could result in inconsistent cache entries. Attempts to maintain consistency by communicating every directory change at every server to every client caching directory entries could flood a network with these messages, vitiating any performance advantages from the directory caching.

It would, therefore, provide greatly improved operating efficiency in accessing file directories in networks as described above to have the ability to cache file directory information and be assured of its validity, while not needlessly and inefficiently updating this information during periods when no changes have been made.

SUMMARY OF THE INVENTION

Accordingly, an improved directory caching technique is provided for a plurality of data processing systems which are connected together in a network. In the system, when a local, or client, data processing system interrogates a remote, or server, data processing system for a unit of directory information, the server is enabled to automatically send additional units of pertinent directory information back to the client system in response to a subsequent change in the directory structure of the server system. If the server system is unable to continue updating the client system, for any of a plurality of possible reasons, the server system informs the client system of this fact, which enables the client system to purge itself of the formerly stored directory cache entry relative to this path, since the client system can no longer consider this cached path information to be currently correct.

Possible reasons that the server system can no longer continue to send directory path updating information to the client system are: (1) a general saturation of server processing resources, (2) a saturation of the server's processing resources which have been allocated to the directory caching updating function, (3) the current unavailability of a reliable communications link between the server system and the client system, (4) the necessity of disconnecting the server system from the communications network, for example, to allow maintenance services at the server system, and (5) because of a lack of a recent inquiry from the client system.

When a server system is updating a plurality of clients and nears exhaustion of its resources to perform this updating function, the server informs the clients having the least recent inquiries, on the basis that those clients' systems' performances would be least affected by having this updating facility suspended.

The foregoing and other objects, features, extensions and advantages of the invention will be apparent from the following more particular description of the preferred embodiments of the invention as illustrated in the accompanying drawing.

BRIEF DESCRIPTION OF DRAWING

FIG. 7 is a block diagram, similar to FIG. 1, showing a distributed data processing system according to the invention;

FIG. 14 shows the client directory tree structure of FIG. 13 and, additionally, a remote, or server, directory tree structure which is available for access by the client system.

FIG. 15 shows the contents of a typical directory cache at a client.

FIG. 16 shows the structure of a typical Node Table at a server.

BEST MODE FOR CARRYING OUT THE INVENTION

Figure 1:
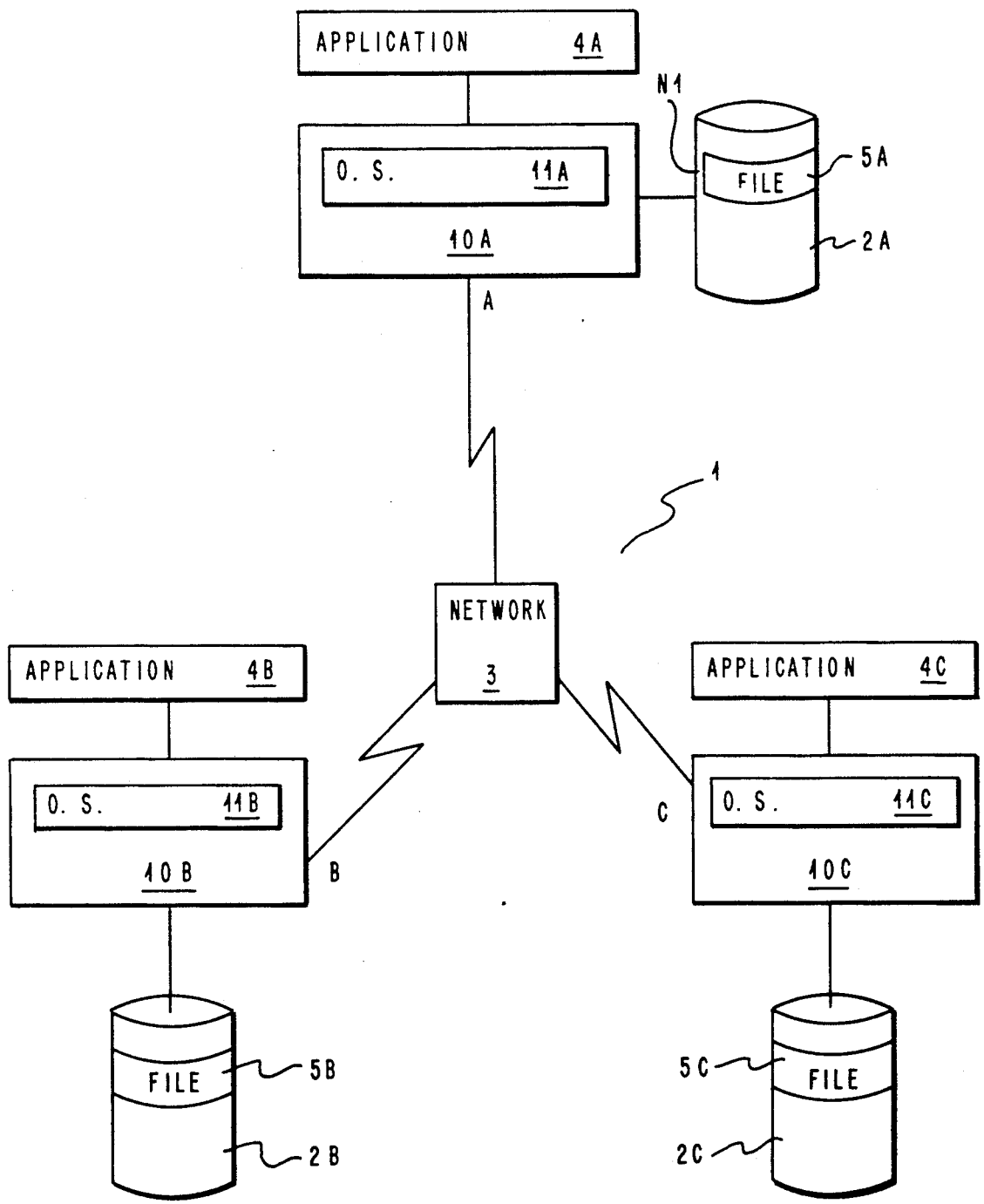
FIG. 1 is a block diagram showing a typical distributed data processing system in which the subject invention is designed to operate.
Figure 2:
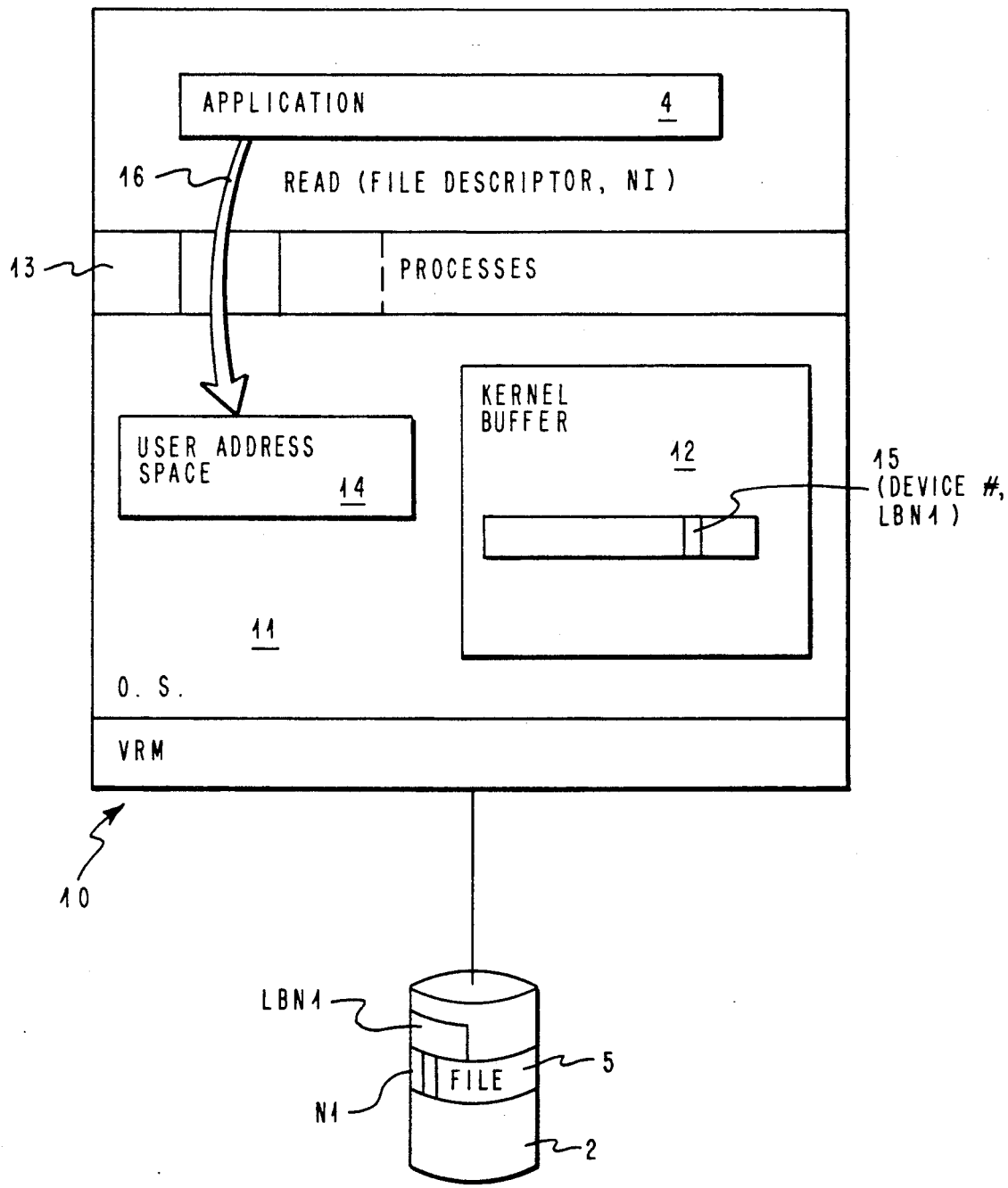
FIG. 2 is a block diagram illustrating a typical stand-alone processor system.
Figure 3:
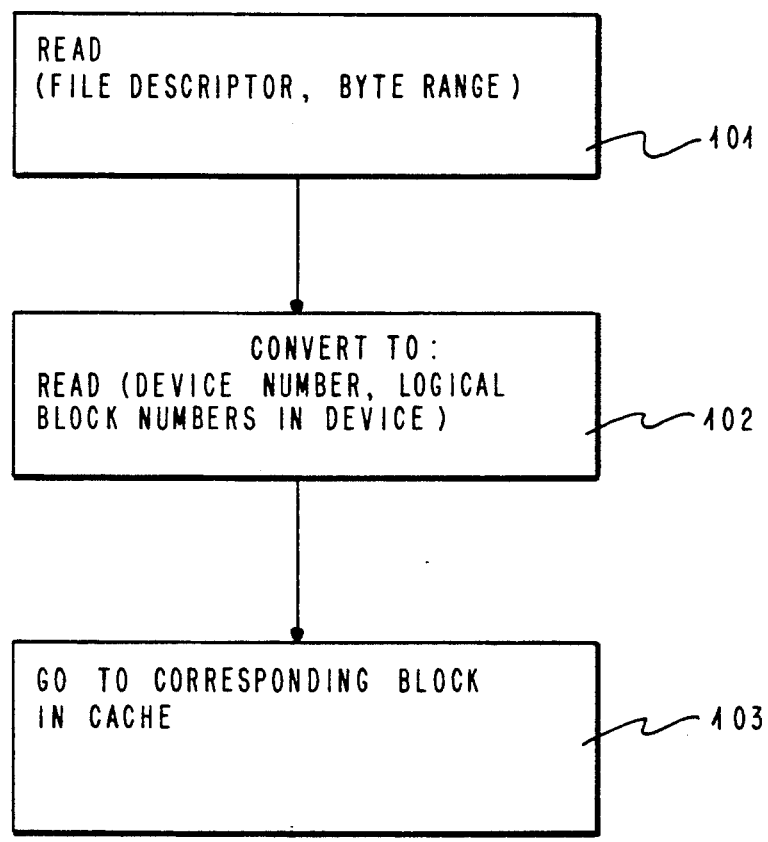
FIG. 3 is a flowchart showing the steps performed by an operating system when a read system call is made by an application running on a processor.

The following disclosure describes solutions to problems which are encountered when creating a distributed file system in which the logic that manages a machine's files is altered to allow files that physically reside in several different machines to appear to be part of the local machine's file system. The implementation described is an extension of the file system of the AIX operating system. Reference should be made to the above-referenced Technical Reference for more information on this operating system. Specific knowledge of the following AIX file system concepts is assumed: tree structured file systems; directories; and file system organization, including inodes.

The essential aspects of a file system that are relevant to this discussion are listed below:

a) each file on an individual file system is uniquely identified by its inode number b) directories are files, and thus a directory can be uniquely identified by its inode number.

Note: In some contexts it is necessary to distinguish between files which are directories and files which are not directories (e.g., files which simply contain ordinary data, or other files types supported by UNIX derivative operating systems such as special files or pipes).

In this disclosure the term "simple file" is used to indicate such a non-directory file. Unless otherwise indicated the term "file" may mean either a directory file or a simple file, and, of course, the term "directory" means a directory file.

c) a directory contains an array of entries of the following form:

name-inode number where the inode number may be that of a simple file or that of another directory.

Note: A directory may contain other directories, which, in turn, may contain other directories or simple files.

Thus a directory may be viewed as the root of a subtree which may include many levels of descendant directories, with the leaves of the tree being "simple files".

In this disclosure the term "descendants" means all of the files which exist in the file tree below a particular directory, even those which can be reached only by going through other directories. The "immediate descendants" of a directory are only those files (simple files or directories) whose names appear in the directory.

d) by convention, the inode number of the file system's root directory is inode number 2.

The following discussion describes how traditional UNIX operating systems use mounts of entire file systems to create file trees, and how paths are followed in such a file tree.

Following the path "/dir1/dir2/file" within a device's file system thus involves the following steps:

1. Read the file identified by inode number 2 (the device's root directory).

2. Search the directory for an entry with name=dir1.

3. Read the file identified by the inode number associated with dir1 (this is the next directory in the path).

4. Search the directory for an entry with name=dir2.

5. Read the file identified by the inode number associated with dir2 (this is the next directory in the path).

6. Search the directory for an entry with name=file.

7. The inode number associated with file in this directory is the inode number of the simple file identified by the path "/dir1/dir2/file".

The file trees which reside on individual file systems are the building blocks from which a node's aggregate file tree is built. A particular device (e.g., hard file partition) is designated as the device which contains a node's root file system. The file tree which resides on another device can be added to the node's file tree by performing a mount operation. The two principal parameters to the mount operation are (1) the name of the device which holds the file tree to be mounted and (2) the path to the directory upon which the device's file tree is to be mounted. This directory must already be part of the node's file tree; i.e., it must be a directory in the root file system, or it must be a directory in a file system which has already been added (via a mount operation) to the node's file tree.

After the mount has been accomplished, paths which would ordinarily flow through the "mounted over" directory instead flow through the root inode of the mounted file system. A mount operation proceeds as follows:

1. Follow the path to the mount point and get the inode number and device number of the directory which is to be covered by the mounted device.

2. Create a data structure which contains essentially the following:

a) the device name and inode number of the covered directory; and b) the device name of the mounted device.

The path following in the node's aggregate file tree consists of (a) following the path in a device file tree until encountering an inode which has been mounted over (or, of course, the end of the path); (b) once a mount point is encountered, using the mount data structure to determine which device is next in the path; and (c) begin following the path at inode 2 (the root inode) in the device indicated in the mount structure.

The mount data structures are volatile; they are not recorded on disk. The list of desired mounts must be re-issued each time the machine is powered up as part of the Initial Program Load (IPL). The preceding discussion describes how traditional UNIX operating systems use mounts of entire file systems to create file trees and how paths are followed in such a file tree. Such an implementation is restricted to mounting the entire file system which resides on a device. The virtual file system concept described herein and in the reference material allows (1) mounting a portion of the file system which resides on a device by allowing the mounting of files (directories or simple files) in addition to allowing mounting of devices, and (2) mounting either remote or local directories over directories which are already part of the file tree. The invention described herein is an enhancement to the virtual file system concept which further allows the mounting of simple files (remote or local) over simple files which are already part of the file tree.

In the virtual file system, the operations which are performed on a particular device file system are clearly separated from those operations which deal with constructing and using the node's aggregate file tree. A node's virtual file system allows access to both local and remote files.

The management of local files is a simpler problem than management of remote files. For this reason, the discussion of the virtual file system is broken into two parts. The first part describes only local operations. This part provides a base from which to discuss remote operations. The same data structures and operations are used for both remote and local operations. The discussion on local operations describes those aspects of the data and procedures which are relevant to standalone operations. The discussion on remote operations adds information pertinent to remote operations without, however, reiterating what was discussed in the local operations section.

Figure 4:
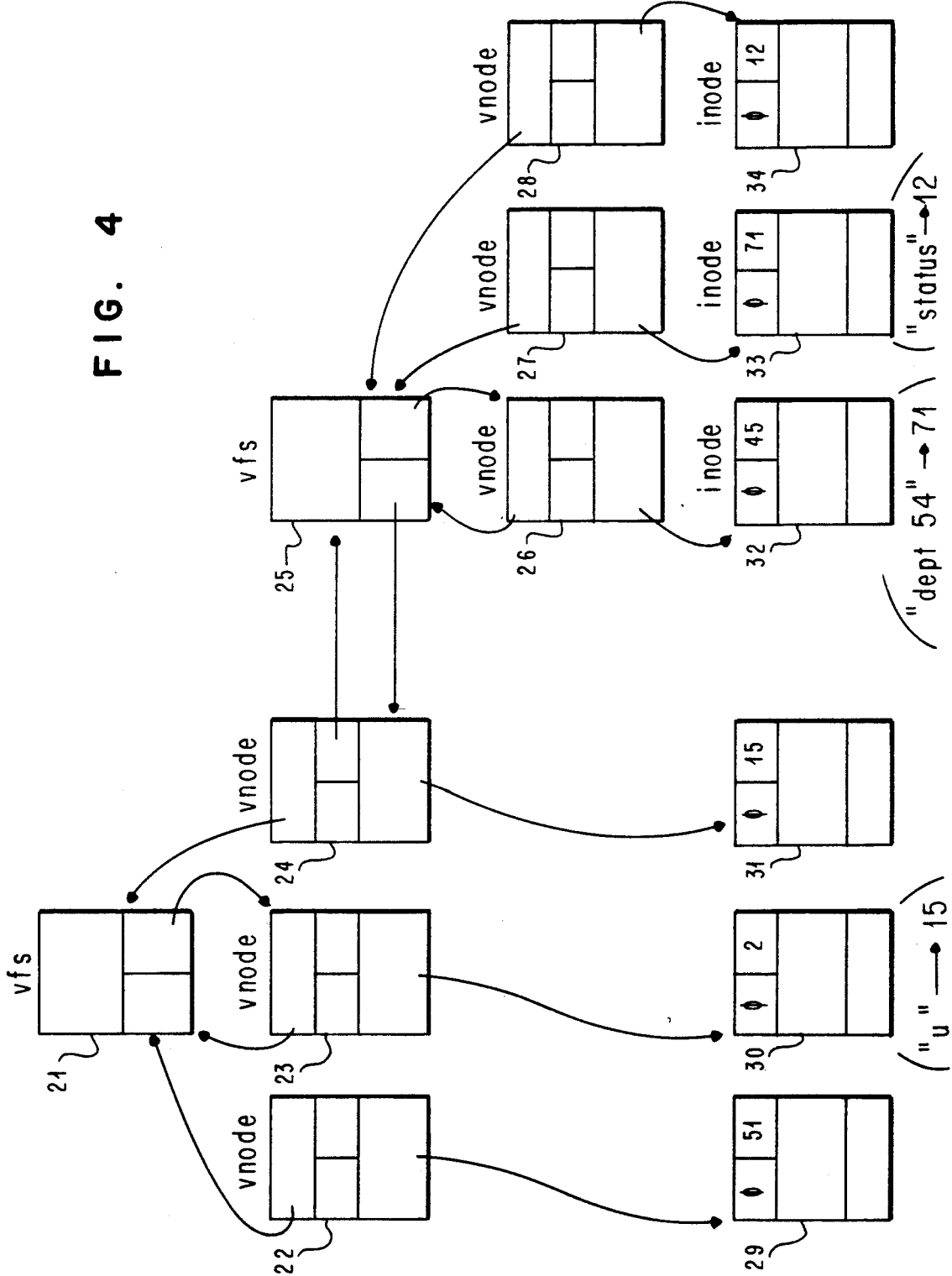
FIG. 4 is a block diagram of the data structure illustrating the scenario for following a path to a file operation at a local node as performed by the operating system which supports the subject invention.

FIG. 4 shows the relationship that exists among the data structures of the virtual file system. Every mount operation creates a new virtual file system (vfs) data structure. The essential elements in this structure are (a) a pointer to the root vnode (virtual node) of this virtual file system (e.g., the arrow from block 21 to block 23), and (b) a pointer to the vnode which was mounted over when this virtual file system was created (e.g., the arrow from block 25 to block 24).

Whenever an inode needs to be represented in the file system independent portion of the system, it is represented by a vnode. The essential elements in this structure are the following:

a) a pointer to the vfs which contains the vnode (e.g., the arrow from block 22 to block 21);
b) a pointer to the vfs which is mounted over this inode (e.g., the arrow from block 24 to block 25); but note however that not all vnodes are the mount point for a virtual file system, i.e., a null pointer indicates that this vnode is not a mount point;
c) a pointer to either a surrogate inode or a real inode (e.g., the arrow from block 26 to block 32); and
d) a pointer to a node table entry (this is a non-null only when the file is a remote file).

The AIX operating system, in common with other UNIX operating systems, keeps a memory resident table which contains information about each inode that is being used by the system. For instance, when a file is opened, its inode is read from the disk and a subset of this inode information, together with some additional information, is stored in the inode table. The essential elements of an inode table entry are (a) a pointer to the head of a file access structure list and (b) information from the disk inode, the details of which are not relevant here.

The file access structure records information about which nodes have the file open, and about the modes (read only or read_write) of these opens. There is a separate file access structure for each node which has the file open. This state information enables the server to know how each client is using the server file.

The file system supports a set of operations which may be performed on it. A process interacts with a file system by performing a file system operation as follows:

1. The user calls one of the operations providing (perhaps) some input parameters.
2. The file system logic performs the operation, which may alter the internal data state of the file
3. The file system logic returns to the calling user, perhaps returning some return parameters.

The operations which can be performed on a file system are referred to as "vn_operations" or "vn_ops". There are several vn_ops, but the ones which are important to this discussion are described below:

VN_LOOKUP

In the vn_lookup operation, the essential iterative step in following a path in a file system is to locate the name of a path component in a directory and use the associated inode number to locate the next file in the chain. The pseudo code for the vn_lookup operation on a local file is listed below:

```
function lookup
  input: directory vnode pointer,
         name to be looked up in directory
  output: vnode pointer to named file/dir.
    convert directory vnode pointer
      to an inode pointer;
        -- use pointer in vnode
    lock directory's inode;
    if( we don't have search permission in
        directory )
      unlock directory inode;
      return error;
    search directory for name;
    if( found )
      create file handle for name;
        -- use inode found in directory entry;
      get pointer to vnode for file handle;
      unlock directory inode;
      return pointer to vnode;
    else -- not found
      unlock directory inode;
      return error;
```

LOOKUPPN

The lookuppn operation is the function which follows paths. Its input is a path (e.g., "/dir1/dir2/file"), and its return is a pointer to the vnode which represents the file. Lookuppn calls vn_lookup to read one directory, then it checks to see if the vnode returned by vn_lookup has been mounted over. If the vnode is not mounted over, then lookuppn calls vn_lookup in the same file system. If the vnode has been mounted over, then lookuppn follows the pointer from the mounted over vnode (e.g., block 24 in FIG. 4) to the vfs of the mounted file system (e.g., block 25 in FIG. 4). From the vfs, it follows the pointer to the root vnode (e.g., block 26 in FIG. 4) and, if the vnode is a directory and not a simple file, issues a new vn_lookup giving as input the vfs's root vnode and the name which constitutes the next element in the path. The pseudo code for the lookuppn function is listed below:

```
function lookuppn
```

```
input: pathname
output: pointer to vnode for named file
    if( first character of path is '/' )
        current vnode for search is user's root
            directory vnode;
    else
        current vnode for search is user's
            current directory vnode;
    repeat
        if( next component of path is ".." )
            while( current vnode is root of a
                virtual file system )
                current vnode becomes the vnode that
                    the virtual file system is mounted
                    over;
                if( there is not mounted over vnode )
                    return( error ); -- ".." past root
                        of file system
        use vn_lookup to look up path component
            in current vnode;
        if( vn_lookup found component );
            current vnode becomes the vnode
                returned by vn_lookup;
            while( current vnode is mounted over )
                follow current vnode's pointer to vfs
                    structure that represents the
                    mounted virtual file system;
                current vnode becomes root vnode of
                    the mounted vfs;
        else -- vn_lookup couldn't file component
            return( error ); -- search failed
    until( there are no additional path
        components );
    return( current vnode );
```

The operation will be illustrated by describing the scenarios of following a path to a file and mounting a directory. First, in following a path to a file, suppose an application process issues a system call (e.g., open) for file "/u/dept54/status". This request is accomplished by the operating system in the following manner with reference to FIG. 4 (operations which are basically unchanged from the UNIX operating system are not explained here in any detail). The following assumptions are made: First, the vfs represented by block 21 is the root virtual file system. Second, the file "/u" is represented by vnode block 24 and inode block 31. Third, a previous mount operation has mounted a device's file system onto the directory "/u". This mount created the vfs represented by block 25. Fourth, all of the directories and files involved are on the same device. Fifth, the following directory entries exist in the indicated directories:

| DIRECTORY INODE NUMBER | NAME | INODE NUMBER |
|---|---|---|
| 2 | "u" | 15 |
| 45 | "dept54" | 71 |
| 71 | "status" | 12 |

The code which implements the system call calls lookuppn to follow the path. Lookuppn starts at the root vnode (block 23) of the root virtual file system (block 21) and calls vn_lookup to look up the name "u" in the directory file represented by this vnode. Vn_lookup finds in the directory that the name "u" is associated with inode 15 in block 31. Vn_lookup must return a pointer to a vnode associated with inode 15. To do this it first brings inode 15 into the inode table. Then it checks to see if there is already a vnode in the parent vfs (the input vnode (block 23) has a pointer to the parent vfs) for this vnode. In this case there is. Vn_lookup then finds the vnode (block 24) in the root vfs (block 21) and returns a pointer to the vnode. Lookuppn discovers that the returned vnode is mounted over in the parent vfs. It follows the "mounted over" pointer from the vnode (block 24) to the mounted vfs (block 25). Lookuppn follows the "root vnode" pointer to the root vnode (block 26) of the new vfs (block 25). Lookuppn now calls vn_lookup again, this time inputting a pointer to the root vnode (block 26) and name "dept54". As before, vn_lookup reads the directory, finds the inode associated with the name, finds or creates a vnode for this inode in the parent vfs (block 25) and returns a pointer to this vnode. Lookuppn calls vn_lookup once more inputting the vnode for the just found directory and the name "status". Vn_lookup reads the directory, finds the inode associated with the name (block 34), finds or creates a vnode (block 28) for this inode in the parent vfs (block 25) and returns a pointer to this vnode. The code which implements the system call now performs the requested operation on the file.

Suppose now that an application process issues a "mount" system call to mount the file "/u/gorp" over the directory "/u/foo". The following scenario explains how this request is accomplished by the operating system (again, operations which are basically unchanged from the UNIX operating system are not explained in any detail).

Figure 6:
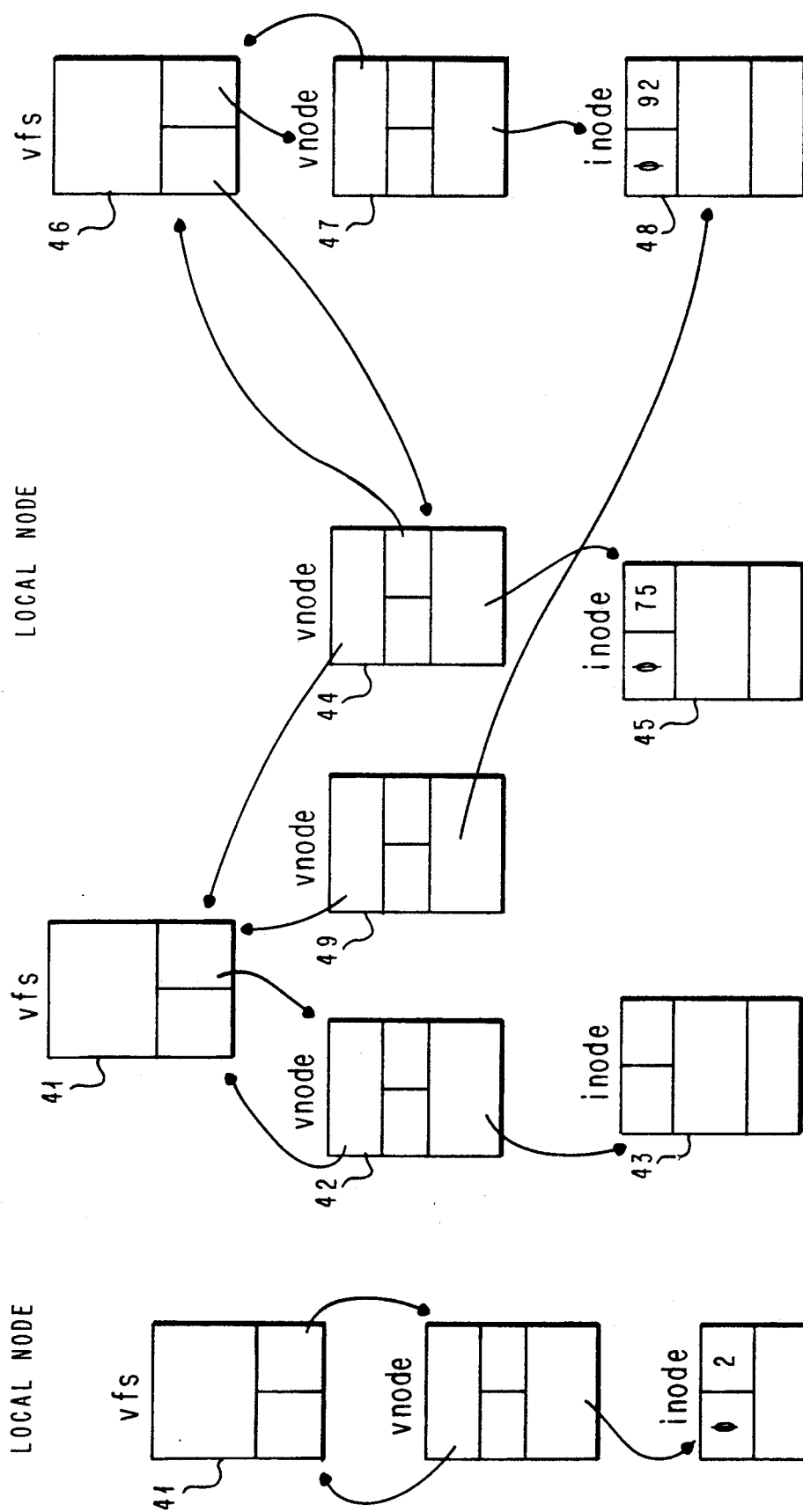
FIGS. 5 and 6 are block diagrams of the data structures illustrating the before and after conditions of the scenario for a mount file operation at a local node as performed by the operating system.
Figure 5:
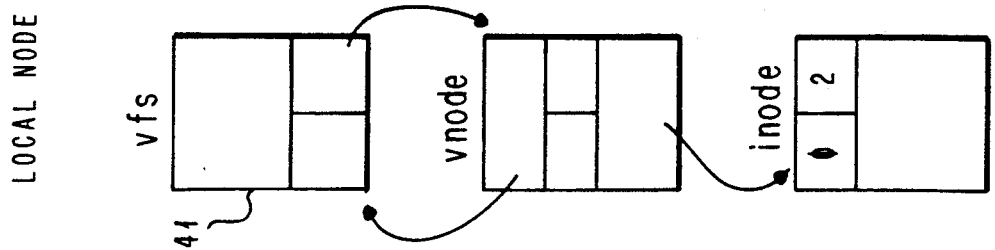

This scenario refers to FIG. 5, which represents initial conditions, and FIG. 6, which represents the final conditions, with the following assumptions: First, the vfs represented by block 41 is the root virtual file system. Second, all of the directories and files involved are on the same device. Third, the following directory entries exist in the indicated directories:

| DIRECTORY INODE NUMBER | NAME | INODE NUMBER |
|---|---|---|
| 2 | "u" | 15 |
| 2 | "etc" | 83 |
| 15 | "gorp" | 92 |
| 83 | "foo" | 75 |
| 75 | "file1" | 89 |

. The code which implements the mount system call performs the following operations. Lookuppn is called to follow the path to the file which is to be mounted over—"/etc/foo". At the completion of this operation, the root vfs (block 41) contains a vnode for "/etc/foo" (block 44) which has a pointer to the root vfs (block 41) and pointer to an inode table entry (block 45) for inode 75. Lookuppn is called to follow a path to the file which is to be mounted—"/etc/gorp". At the completion of this operation, the root vfs (block 41) contains a vnode for "/etc/gorp" (block 49) which has a pointer to the root vfs (block 41) and a pointer to an inode table entry (block 48) for inode 92. Now the mount logic creates the new virtual file system by first creating a new vfs (block 46) and then creating a root vnode for this vfs (block 47) with a pointer back to its parent vfs (block 46) and a pointer to the root inode (inode 92, block 48) of the vfs. A "mounted over" pointer is installed in the covered vnode (block 44) in the root vfs (block 41), and a pointer to the vnode upon which it is mounted (block 44) is installed in the new vfs.

Figure 13:
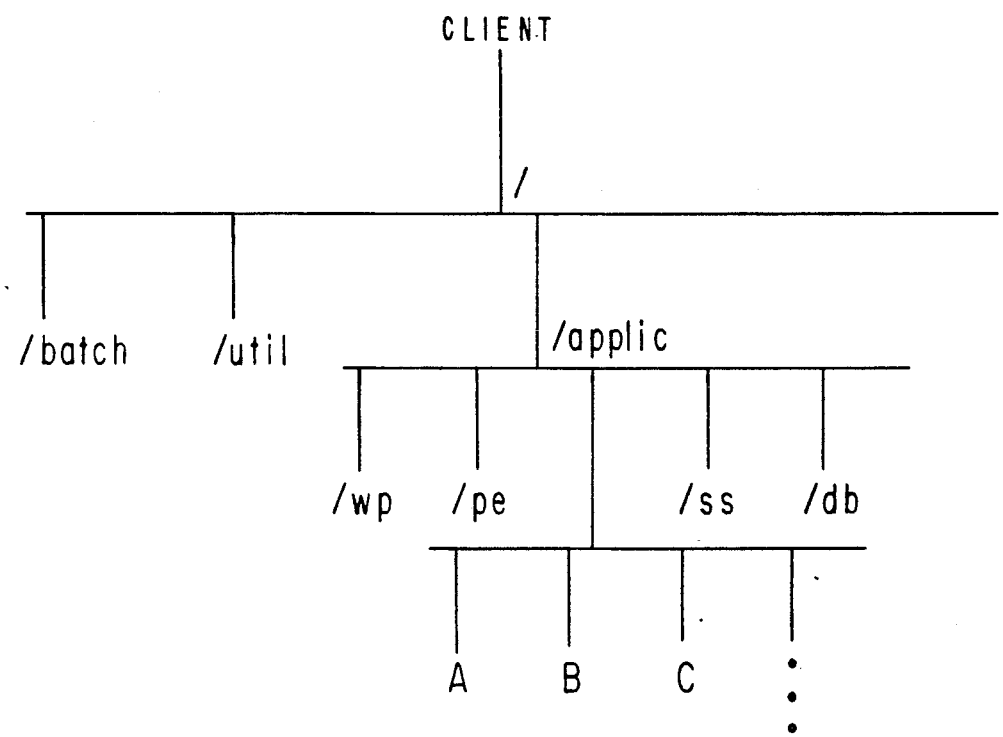
FIG. 13 shows a typical directory tree structure which exists at a local or client system.
Figure 44:
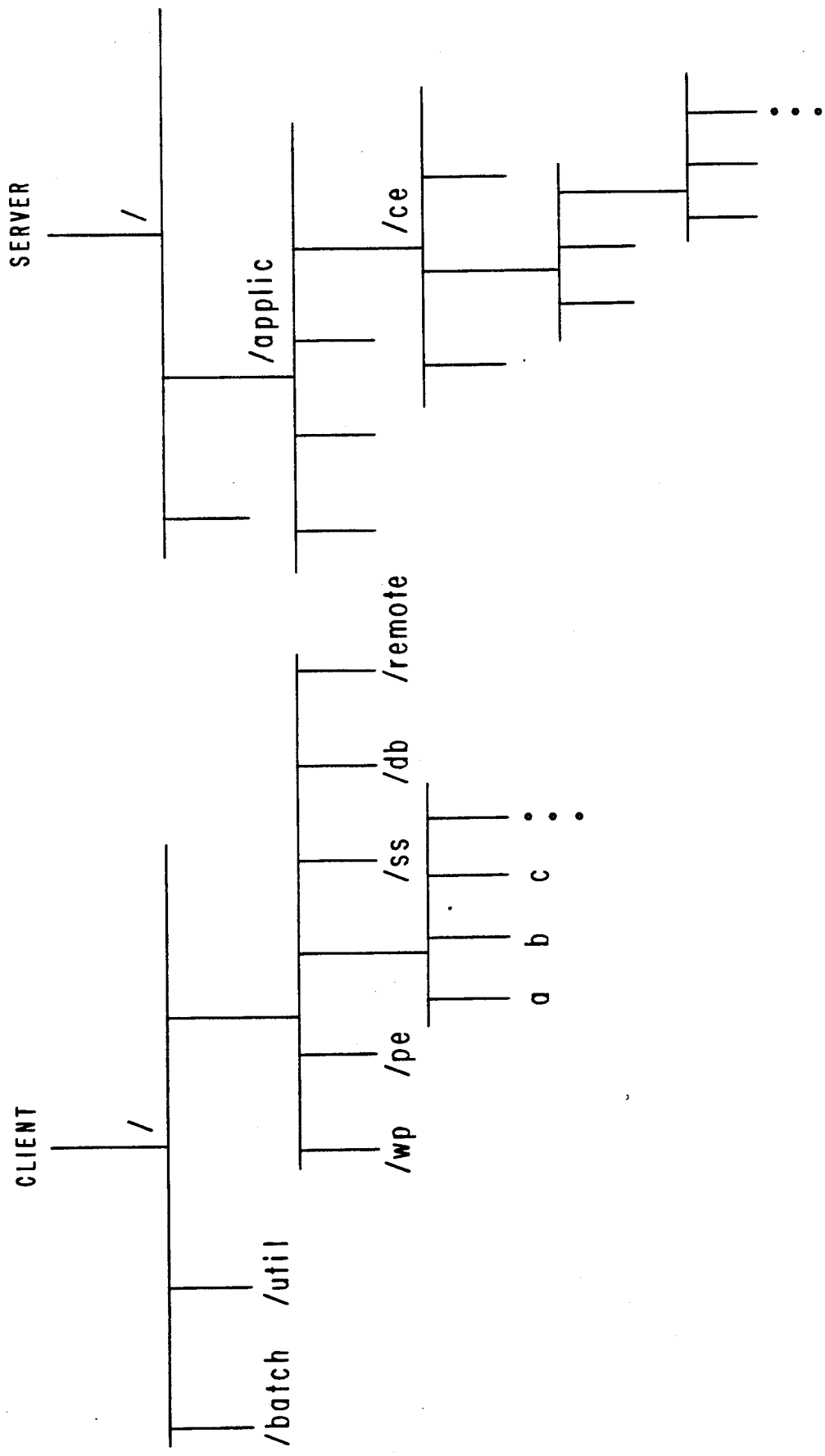

The foregoing illustrates the data structure for standalone operation. Reference is now made to FIG. 13 which shows a distributed system similar to that shown in FIG. 1 in which the operating system which supports the present invention has been implemented. In the following description, the term "server" is used to indicate the node where a file is permanently stored, and the term "client" is used to mean any other node having processes accessing the file. It is to be understood, however, that the term "server" does not mean a dedicated server as that term is used in some local area network systems. The distributed services system in which the invention is implemented is a truly distributed system supporting a wide variety of applications running at different nodes in the system which may access files located anywhere in the system.

Figure 8:
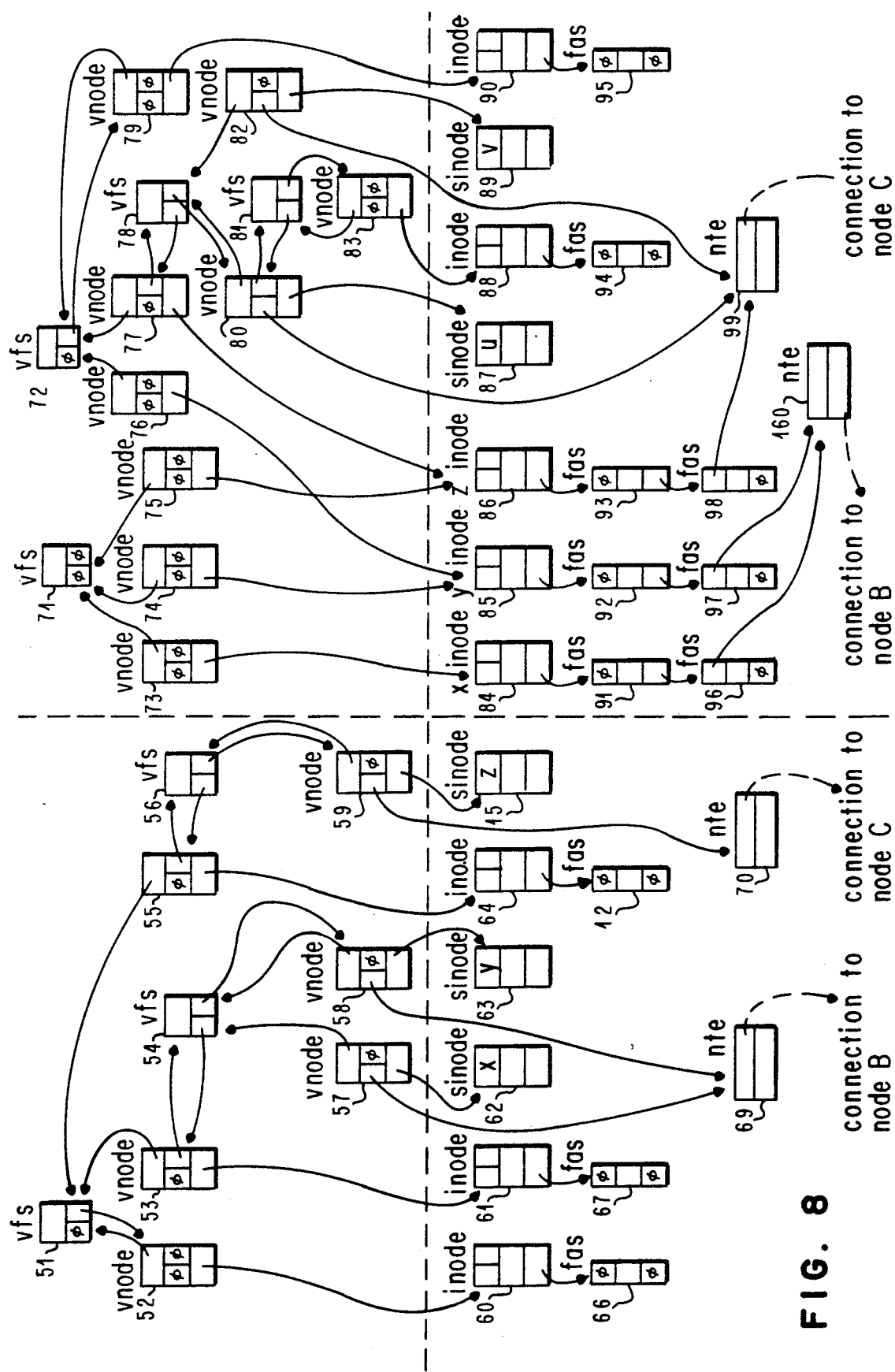
FIG. 8 is a block diagram of the data structure for the distributed file system shown in FIG. 7.
Figure 9A:
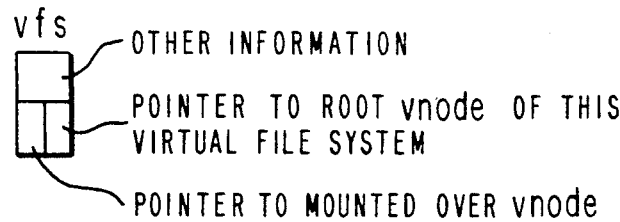
FIGS. 9A, 9B, 9C, 9D, 9E and 9F are block diagrams of component parts of the data structure shown in FIG. 8.
Figure 9B:
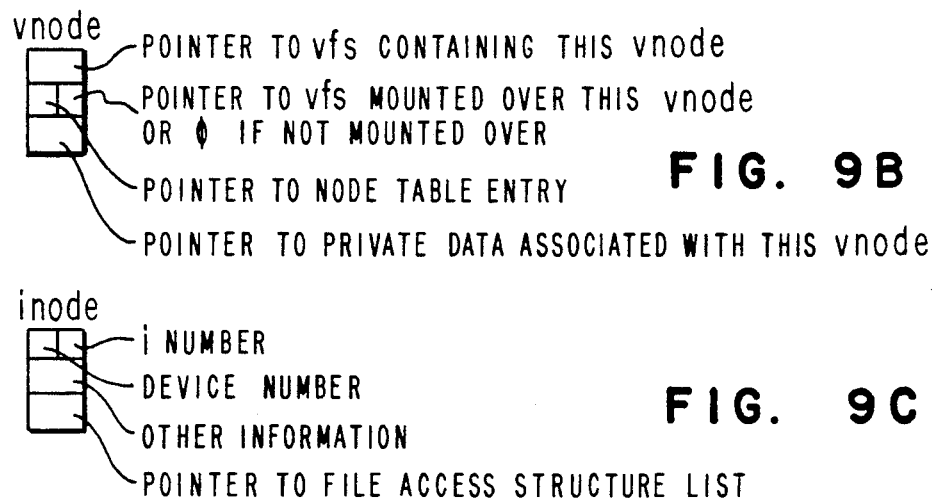
Figure 9C:
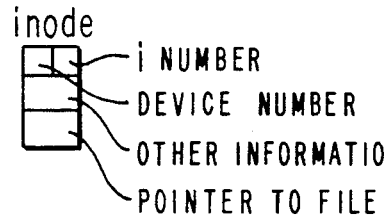
Figure 9D:
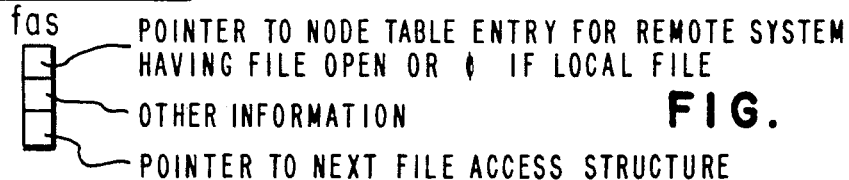
Figure 9E:
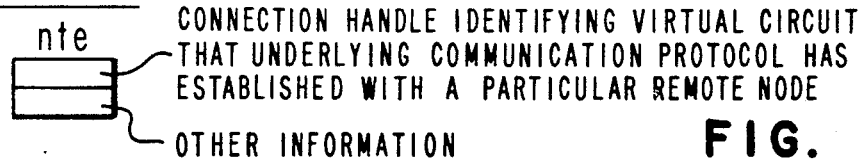
Figure 9F:
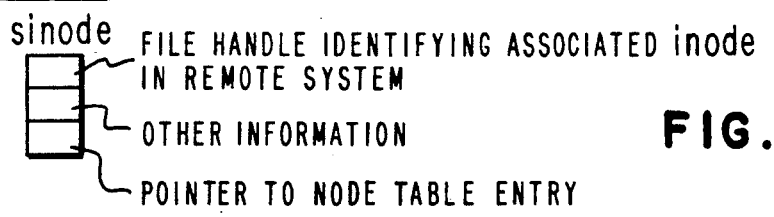

The data structure for the distributed system shown in FIG. 13 is illustrated in FIG. 8, and the component parts of that data structure are shown in FIGS. 9A to 9F. With reference to FIG. 8, a client node may have access to files which reside in a remote server node. Such a client gains access to a server's files by mounting one of the server's files. In the client node, the data structures created by a remote mount operation compare to those created by mounting a local entity in the following ways: Just as in the local case, a remote mount creates a vfs in the client node (e.g., block 54). Just as in the local case, use of a file in a virtual file system which contains remote files creates a vnode structure in the client node (e.g., block 57). Just as in the local case, the vnode structure has a pointer to a inode table entry (e.g., block 63). The inode table entry, however, does not contain the inode information from the remote file. Instead, the inode table entry contains a surrogate inode. This surrogate inode stands for, or represents, the remote inode.

In the server node, some data structures are constructed to allow the server to record state information about how remote nodes are using its files. More specifically, each server has a "dummy vfs" (e.g., block 71) to provide a vfs to hold files open by remote clients. The dummy vfs is not a part of the server's file tree. For each file which is open by a remote node, there is a vnode (e.g., block 74) in the server's dummy vfs. Each file which is open by a remote node has an inode table entry in the server's inode table (e.g., block 85). This inode table entry is the same as that which exists because a local process at the server has a file open. For example, block 84, which is in the table because of a remote open, has the same structure as block 88, which is in the table because of an operation at the server.

When a client and server communicate about a server file, they need a way to identify the file. This is done with a file handle. When a client request causes the server to reply with a designation of a particular file (e.g., a remote lookup request), the file is identified by a file handle. When a client request carries a designation of a particular file (e.g., a remote open request), the file is identified by a file handle. The file handle contains the following fields: device number, inode number, and inode generation number.

The need for a file handle is illustrated by the following scenario. Suppose a client makes a request of a server and gets a file handle in reply. The client stores and remembers the file handle. Some activity at the server causes the file to be deleted and the inode slot reused for another file. The client makes a request of the server using the stored file handle. The server receives the file handle and performs the operation on the new file. This would be an unacceptable operation.

This flaw is prevented by use of the inode generation number. The inode generation number is stored on disk as a field in the inode. When the server deletes a file, it increments the inode generation number. If a request arrives at a server, the file handle is broken apart, the device number and inode number are used to locate the inode, and then the file handle inode generation number is compared to the inode's inode generation number. If they are different, then the request is rejected.

When a client wants to open a file which resides on a remote server, it uses a network transport mechanism to establish a connection with the server. Subsequent transactions regarding this file (e.g., read, write, etc.) flow on this connection. Each node contains a node table. A node uses entries in its node table (e.g., block 70) to record information about existing connections to remote nodes.

There are a limited number of operations that one node in the network can request another node to perform on its behalf. These operations are called dfs_ops. When a node makes a request of another node, the following operations occur: First, the requesting node sends a message which specifies which dfs_operation is being requested and carries the parameters appropriate to that request. Next, the receiving node receives the request and performs the specified operation. Finally, the receiving node sends a message which carries the reply parameters appropriate for the dfs_operation.

There is a close correlation between the vn_ops that are issued within a local node to a file system and the dfs_ops that are issued over the network. A typical operation on a remote file is as follows: First, a local kernel issues a vn_op, not knowing whether the file being operated on is remote or local. Second, since the file resides in a remote node, the file system implementation code sends the corresponding dfs_op to the node which holds the file. Note that if the file had been a local file, the operation would have been performed, the return parameters would have been returned, and the task would have been complete. Third, the node which holds the file receives the dfs_operation request and requests its local file system to perform the corresponding vn_operation. The return parameters from this vn_op are used to construct the return parameters for the dfs_op. Fourth, the requesting node receives the dfs_op reply from the server node and uses the dfs_op return parameters to construct the return parameters to the original vn_operation request.

Figure 10:
FIGS. 10, 11 and 12 are block diagrams of the data structures illustrating the scenarios for a mount file operation and following a path to a file at a local and remote node in a distributed system as performed by the operating system.
Figure 11:
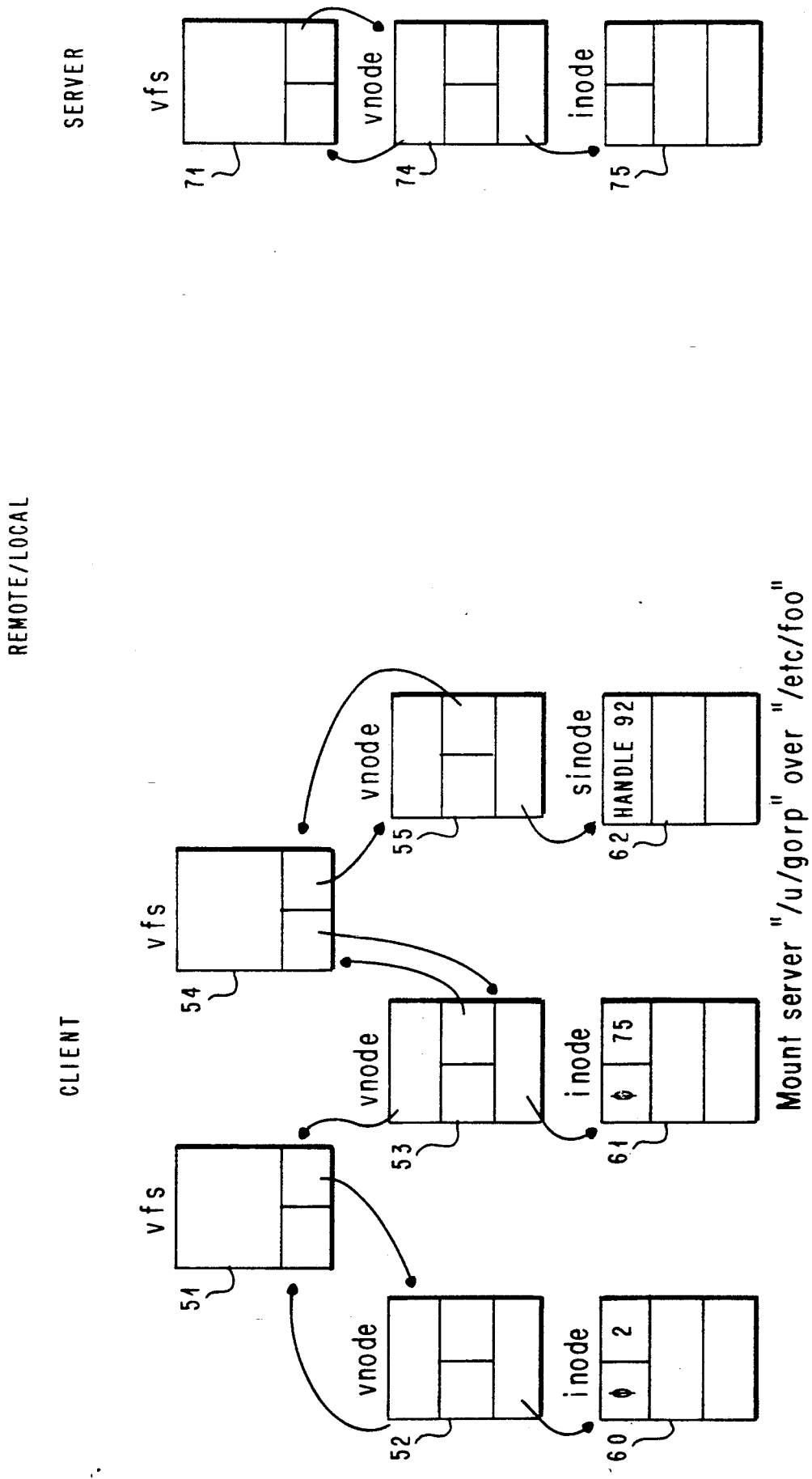

The operation will be illustrated by describing the scenarios of mounting a remote file over a local file and following a path to a file. In the first scenario, suppose that an application process in a client node issues a "mount" system call to mount a server node's file "/u/gorp" over the local client file "/etc/foo". The following scenario explains how this request is accomplished. This scenario refers to FIG. 10, which represents the initial conditions, and to FIG. 11, which represents the final condition, with the following assumptions: The vfs represented by block 51 is the root virtual file system of the server's file tree, and all the server directories and files involved are on the same device. The following entries exist in the indicated directories:

| DIRECTORY INODE NUMBER | NAME | INODE NUMBER |
| --- | --- | --- |
| | Server Node | |
| 2 | "u" | 15 |

| DIRECTORY INODE NUMBER | NAME | INODE NUMBER |
|---|---|---|
| 15 | "gorp" | 92 |
| 92 | "file2" | 67 |
| Client Node | | |
| 2 | "etc" | 83 |
| 83 | "foo" | 75 |

The code which implements the mount system calls lookuppn to follow the path to the file which is to be mounted over—"/etc/foo". At the completion of this operation, the root vfs (block 51) contains a vnode for "/etc/foo" (block 53) which has a pointer to the root vfs (block 51) and a pointer to an inode table entry (block 61) for inode 75. Since the file being mounted resides in a remote node, a dfs_mount request is issued to the server node, passing the path "/u/gorp" as the path to the object to be mounted. Upon receiving the dfs_mount request, the server node calls lookuppn to follow the path to the file which is to be mounted—"/u/gorp". At the completion of this lookup operation, the server's root vfs (block 71) contains a vnode for "/u/gorp" which has a pointer to the root vfs and pointer to an inode table entry for inode 92. The server uses the information in the inode (device 0, inode 92) to construct a file handle for the file "/u/gorp". The server returns this file handle in the reply to the dfs_mount request and then releases the vnode and inode. Finally, the client receives the file handle in the reply to the dfs_mount request and performs the operations necessary to create the new virtual file system as follows:

a) Create a new vfs (block 54).
b) Create a root vnode for this vfs (block 55) with a pointer back to its parent vfs (block 54) and a pointer to the root inode of the vfs (block 62). Since the root inode of this vfs is a remote file, the inode pointed to from the root vnode is a surrogate inode. This surrogate inode contains the file handle returned by the server in response to the client's dfs_mount request.
c) Install a "mounted over" pointer in the covered vnode (block 53) in the root vfs (block 51).
d) Install in the new vfs (block 54) a pointer to the vnode upon which it is mounted (block 53).

Figure 12:
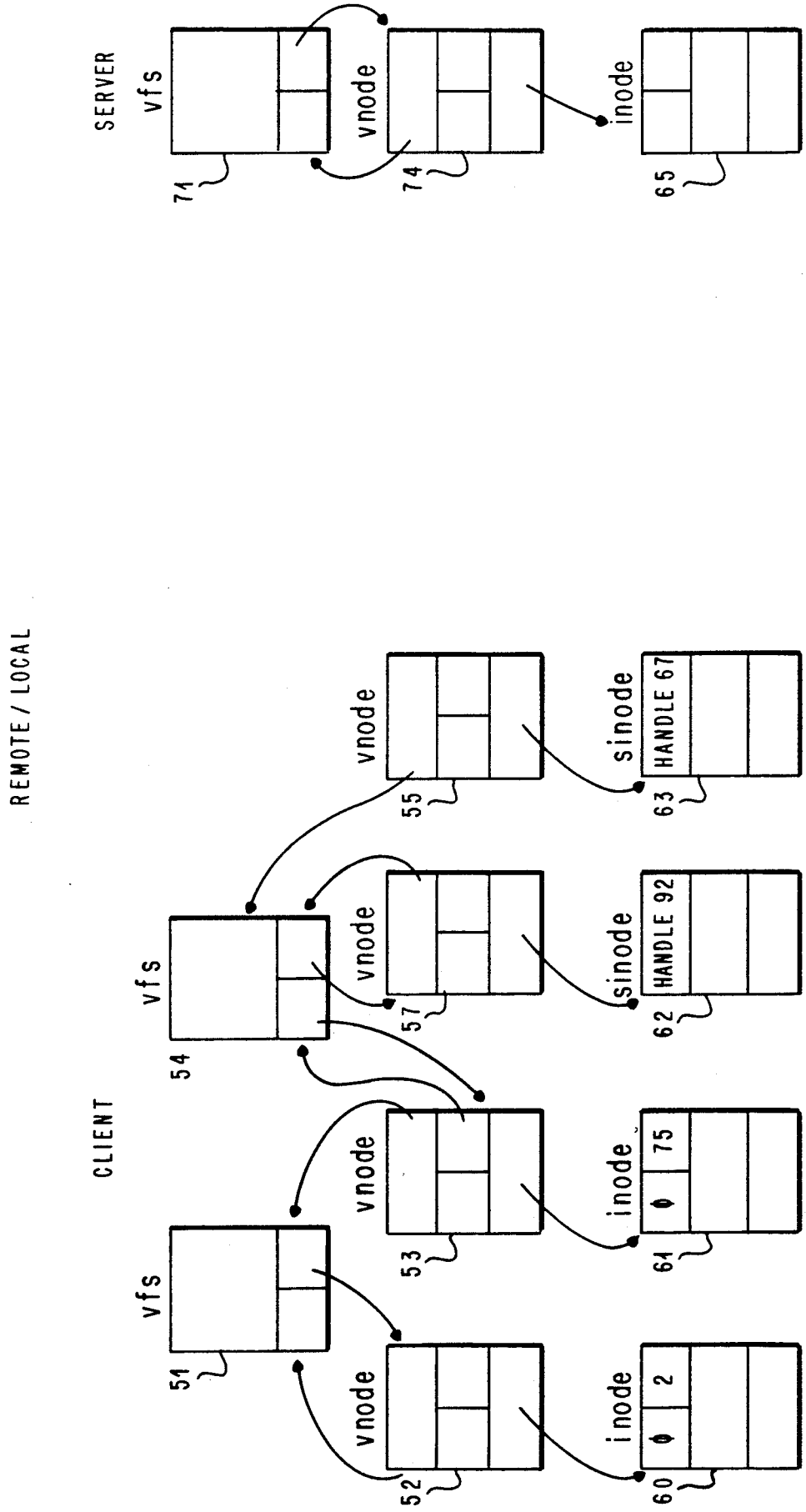

Suppose now that after executing the remote mount described above (mount server /u/gorp over client /etc/foo) a client process issues a system call to operate on the file "/etc/foo/file2". The block numbers in the following scenario refer to FIG. 11, which represents initial conditions, and FIG. 12, which represents the system state after the open operation. First, the code which implements the system call calls lookuppn to follow the path. Lookuppn starts at the root vnode (block 52) of the root virtual file system (block 51) and calls vn_lookup to look up the name "u" in the directory file represented by this vnode. Vn_lookup finds in the directory that the name "u" is associated with inode 15. Vn_lookup constructs a vnode and inode in the root virtual file system for inode 15 and returns to lookuppn a pointer to this vnode. Lookuppn calls vn_lookup again, this time to look up the name "foo" in the directory identified by inode 15. Vn_lookup reads the indicated directory and discovers that the name "foo" is associated with inode 75 in block 61. There already exists in the root vfs (block 51) a vnode (block 53) for this inode (block 61), so vn_lookup returns a pointer to this vnode. Lookuppn discovers that the vnode is mounted over (the "mounted over" pointer in block 53 points to block 54). Lookuppn thus follows the "mounted over" pointer to the next vfs (block 54) and follows its root vnode pointer to the root vnode (block 55) of the virtual file system. Lookuppn now calls vn_lookup for the next element ("file2") of the path giving vn_lookup a pointer to block 55 and the name "file2". The directory to be searched resides in a remote node and is identified by the file handle stored in the client surrogate inode (block 62). Vn_lookup issues a dfs_lookup to the server which holds the file, sending the file handle which identifies the directory and the name ("file2") which is to be looked up. When the server receives the dfs_lookup, it uses the file handle to identify the directory to be read and issues a vn_lookup to search for the name "file2" in this directory. Vn_lookup reads the directory and discovers that the inode number associated with the name "file2" is 67. Vn_lookup constructs a vnode and inode in the dummy virtual file system for inode 67 and returns to lookuppn a pointer to this vnode. Dfs_lookup uses the information in data structures returned by vn_lookup to construct a file handle for the file identified by inode 67. It returns this file handle to the client, as the reply to the dfs_lookup request, and releases the vnode and inode. In the client, a vnode (block 55) and surrogate inode (block 63) are created for the found file. Since "file2" is the last piece of the path, lookuppn returns to its caller a pointer to the found vnode (block 55). The code which implements the system call now performs the requested operation on the file.

Each server maintains a list of remote nodes that are connected to the server in a structure called the Node Table. The Node Table contains information about connections to other nodes and information about clients caching directory information. Nodes suspected by the server to be caching the server's directory entries are marked as such in the Node Table. The server doesn't know for sure that any client is caching directory entries (for example, a client's cache could have been filled by another server's entries pushing out all of the first server's entries), but the server is "conservative" and believes that any lookup from a request client node results in a cached entry at the client.

Whenever any directory in the server is changed, the server uses the dfs_fs_advise rpc to inform all clients believed to be caching the server's directory entries that some directory entry in the server has changed. A dfs_fs_advise rpc message, indicating that directories have changed at the server, is sent to all nodes in the Node Table that are indicated to be suspected of caching directory entries. After sending a dfs_fs_advise to a client node the Node Table entry for the client node is updated to indicate that the client is not caching any of the server's directory entries. A client that receives such a dfs_fs_advise purges its cache of all entries for directories in the server that sent the dfs_fs_advise. After a dfs_fs_advise is sent to a client by a server, the server will not send any additional dfs_fs_advise rpcs to the client until after the next lookup rpc received by the server from that client. Upon receiving a lookup rpc from a client, the server will mark the Node Table entry for the client as caching directory entries. The server's Node Table can be of fixed size. When adding a new client to a Node Table with no available space, the "oldest" entry in the table with a connection use count of zero, can be removed by sending a dfs_fs_advise to that client. In this way, only the most recent users of a server cache its directory entries. In addition to purging its cache upon receiving a dfs_fs_advise, a client will purge its directory cache of all entries for a server nid whenever it marks the nid's connection as bad or whenever a good connection for the nid is removed, since the client can no longer be sure of receiving needed dfs_fs_advise from that server.

An entry in the Node Table indicating that a client is caching directory entries doesn't represent a use of the connection between the server and the entry's client and it doesn't cause the connection use count to be incremented. Similarly, a server's directory data in a client's cache doesn't cause the corresponding connection to have its use count incremented. Therefore, the connection between a client and a server is not held just because the client is currently caching the server's directory entries. Before dropping a connection with a use count that has gone to zero, a server sends a dfs_fs_advise to the client on the other end of the connection if the client is suspected of caching the server's directory entries. A lost connection doesn't cause serious problems. If there is no connection, the server just forgets about it. Notice that the client will purge its cache when it discovers the bad connection. In order to insure that it will discover that a connection is bad as soon as possible, clients send null RPCs, that is, RPCs that communicate nothing, but the fact that the two nodes are still able to send and receive RPCs over any connection that hasn't been used recently—even if the connection use count is zero —indicates that the communication process remains connected.

FIG. 16 illustrates an example of information appearing in a server's Node Table. For each node id appearing in the Node Table there is a simple flag indicating that the identified node could be caching directory information (flag is Y) or that the identified node is not be caching any directory information (flag is N). In this example, node 5 is not caching any directory information and hence requires no further dfs_fs_advise rpc's when directories change at the server, but node 20 is believed to be caching directory information and should be sent a dfs_fs_advise if a server's directory has a subdirectory renamed or deleted.

FIG. 15 is an example of the kind of data that is stored in a directory cache. In this example notice that information about three different nodes is being cached: nodes with ids 12, 20, and 52. For node 12, there are two entries with the same name, "bin". This is possible because this name "bin" occured in two different directories in node 12. There may be directories that had file handles of 177 and 123 in this case, perhaps representing /bin and /usr/bin, two common directories in AIX TM systems. The tree elements, node id, directory file handle, and name, together form the search key that is used when searching the directory cache. In order to speed up searching of the directory cache the actual data structure used is more complex. Any of the commonly used methods for structuring information for fast searching may be used. The method illustrated in FIGS. 19 and 20 uses a hash table to speed up the searching of the directory cache.

Figures 19, 20:
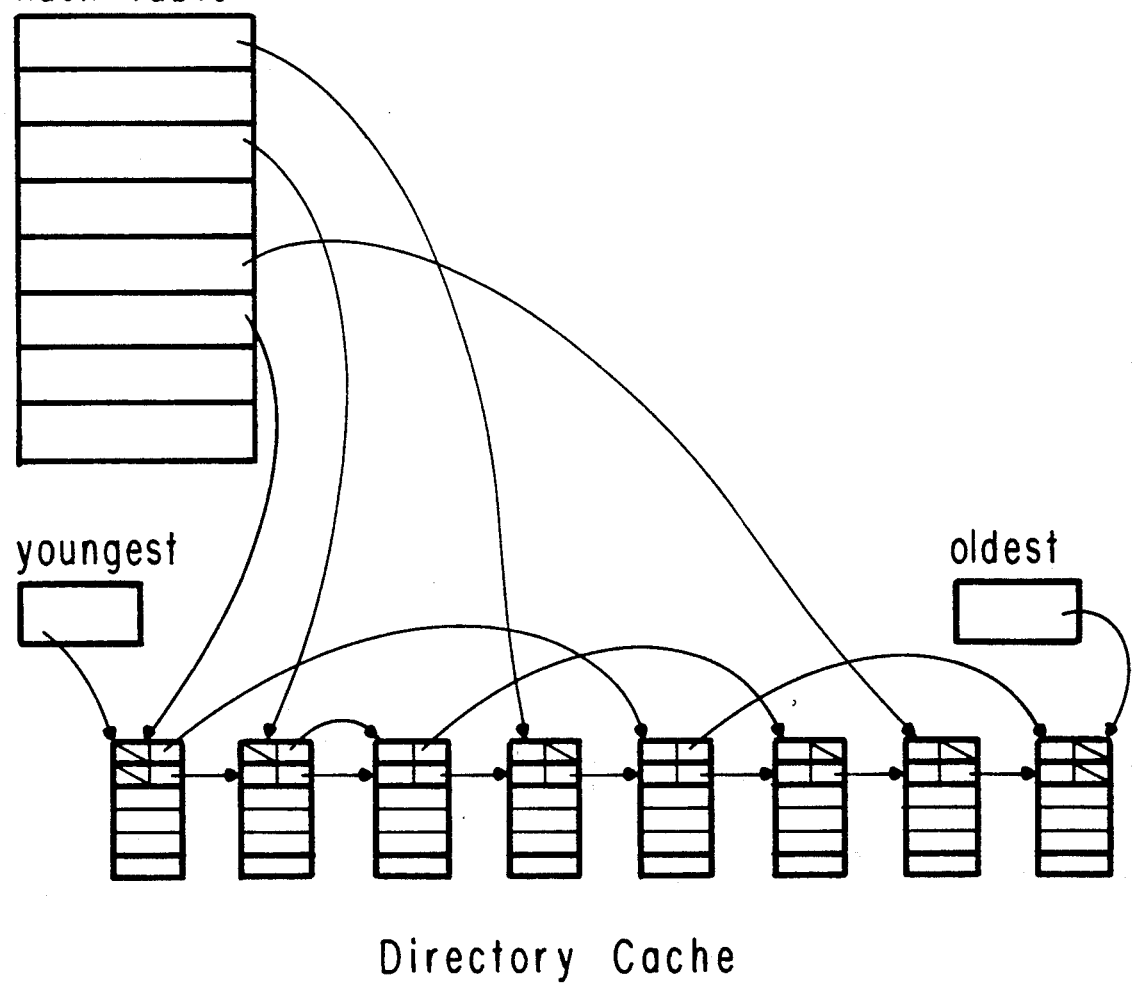
FIG. 19 shows the detailed contents of an entry in the directory cache of FIG. 20.
FIG. 20 shows the hash table technique used in searching the contents of the directory cache.

FIG. 19 illustrates that a directory cache entry will use two pairs of link fields in addition to the four fields discussed above: (1) fields previous and next that are used to link entries into doubly linked lists called previous-next lists and (2) fields younger and older that are used to link all entries into one additional doubly linked list called the younger-older list. Doubly linked lists are used to make insertion and removal straightforward. To move an entry to the beginning or end of a list it is first removed from its current position and inserted into the list at the beginning or end. Notice that each entry is on two lists, some one of the plurality of previous-next lists and the single younger-older list.

FIG. 20 shows how these lists of entries are organized into a complete directory cache. Even though all of the lists are doubly linked, to keep the figure clear only the forward list pointers are shown. The pointer youngest points to the beginning of the younger-older list and the pointer oldest points to the end to the same list. A hash table contains pointers to the beginning of each of the previous-next lists.

A hash function is defined that hashes any node id, directory file handle, and path name part into an index into the hash table. All entries that hash into the same location in the hash table are chained together in the same previous-next list that is pointed to by the pointer in the hash table at that location.

There are four distinct operations that are necessary to support the directory caching operations of this invention: (1) cache invalidation during directory updating at the server, (2) marking nodes as caching during lookup requests being processed at the server, (3) using the directory cache at the client during remote lookup, and (4) purging entries from the cache in response to dfs_fs_advise rpcs received at the client or connection failure between the client and the server. Note that although this discussion focuses on a node's role as a server or a client, most nodes will be acting as both a client for some files and a server for others; therefore, nodes will in generally have support for both client and server operations.

Operation (1), cache invalidation during directory updating at the server is performed as follows: if entry is being removed or renamed

```
{
    if entry is a subdirectory and not just a file
    {
        for each row in the Node Table
        {
            if this row's client is caching
            {
                send dfs_fs_advise to this row's client;
                mark the client as not caching;
            }
        }
    }
}
```

Figure 17:
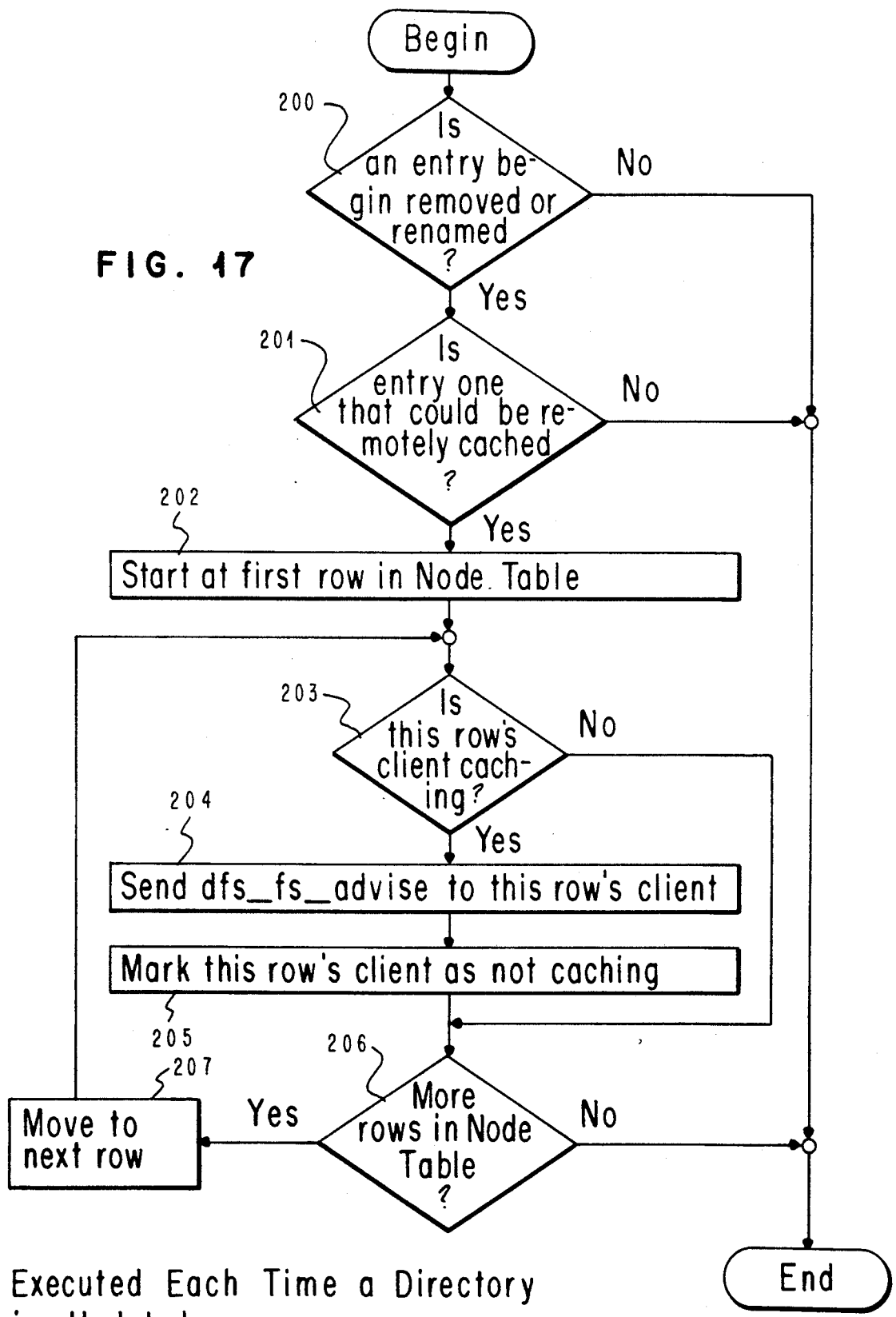
FIG. 17 is a flow diagram which shows the operations at the server during directory updates in a system using the improved directory caching technique of this invention.

Referring now to FIG. 17, an overview flow diagram of the operation at the server in performing operations necessary for the directory caching technique of this invention is shown. The operation depicted in FIG. 17 is executed each time the contents of a directory are updated at a server having a portion of its file system thereof mounted on a client directory.

At step 200 a test is made to determine if the entry in the server directory is being removed or renamed. If not, this operation ends because no information is sent from the server back to the client relative to additional directory contents. At step 200, if an entry in the server directory is being removed or renamed, then a test is made to determine if this server's directory entry is a cachable one, as indicated at step 201. The entry is cachable if it is a subdirectory and is not cachable if it is simply a file. If the entry is not cachable, the operation ends at this point.

If the entry is cachable, the operation proceeds to step 202 at which point the first row in the Node Table (FIG. 16) is addressed. At step 203 the data in this row in the Node Table is tested to determine if the client associated with this row is caching information relative to this server's directory structure. This would be the case if the client has accessed any part of the server's directory structure. If so, at step 204 a fs_advise message is sent to the client associated with this row which advises the client to clear its directory cache information relative to this server. At step 205 the Node Table is marked to indicate that this client is no longer caching subdirectory information and, at step 206 the Node table is checked to determine if more rows exist in the Node Table. If not, the operation ends, but if more rows exist in the Node Table, at step 207 the next row in the Node Table is accessed. The operation then reverts to step 203 as described above. If, at step 203 it is found that a row's client is not caching, the operation bypasses steps 204 and 205 by jumping to step 206 to determine if more rows in the Node Table exist.

It will, therefore, be understood that in this particular embodiment the client is advised to erase all cached directory information relative to a server when any directory structure change occurs at that server. Alternative embodiments would include advising the client to erase only those cached entries related to the particular path that changed or advising the client of the actual changes to that path.

Operation (2), marking nodes as caching directory information during lookup requests is performed as follows: perform the lookup request, requested by some client; if result is a file handle for a directory

```
{
    /* client can cache it */
    find node table entry for client making request;
    mark client as caching directory information;
}
```

Figure 21:
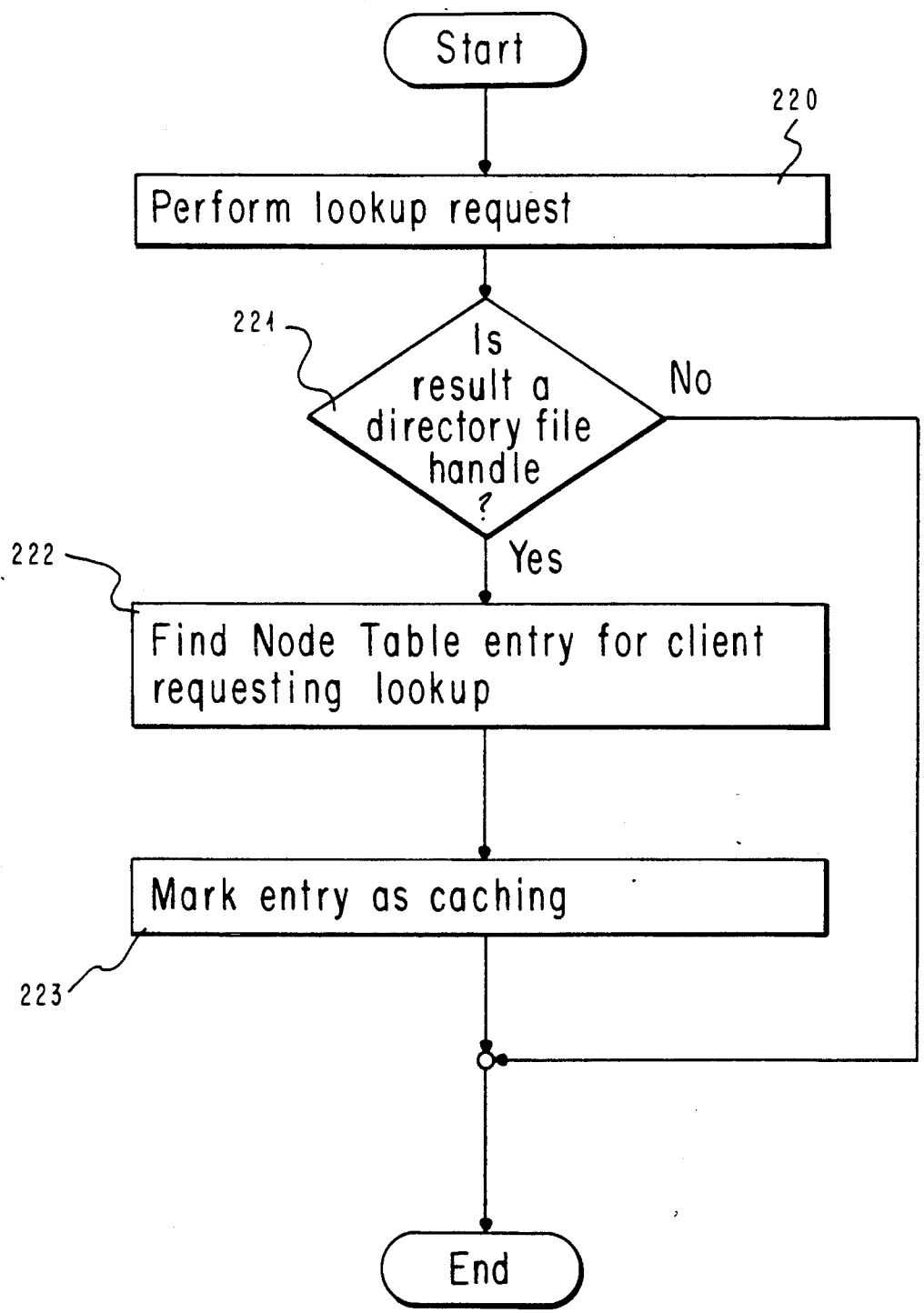
FIG. 21 is a detailed flow diagram of server operations in response to the dfs_lookup rpc request in a system using the improved directory caching technique of this invention.

Referring now to FIG. 21, the detailed flow diagram of an operation at the server in performing operations necessary for the directory caching technique of this invention is shown. The operation depicted in FIG. 21 is executed each time a lookup request is received by a node, that will subsequently act as the server. The request is received from some other node, acting as a client.

At step 220, the lookup request is performed as it would be in the absence of directory caching. At step 221, before returning any answer to the client requesting the lookup, the results of the lookup are examined. If the result of the lookup, a file handle, is something that could be cached by the client, a file handle for a directory, then execution proceeds to step 222. If the result of the lookup is a file handle for an ordinary file, then the client will not be caching this result and the operation ends.

If the result is cachable, the operation proceeds at step 222 at which point the Node Table entry for the client making the request is found. At step 223 this Node Table entry is updated to indicate that the corresponding client may now be caching directory information. After step 223 the operation ends.

It will, therefore, be understood that in this particular embodiment the server simply records a Boolean value indicating whether or not the client is believed to be caching some directory information. Alternative embodiments would include recording more specific information about what values the client had been sent and hence what values the client could be caching.

Operation (3), using the directory cache at the client during remote lookup operates as follows:

```
/* During pathname resolution some directory is
   always the directory in which the search for
   the next pathname component will occur.
   Initially, this directory is the root directory
   or the current working directory depending on
   the original path. During pathname resolution
   in lookuppn, the directory where
   searching is to occur is identified by its vnode
   pointer.
*/
/* Because this is the procedure for remote lookup,
   the directory to be searched is a remote
   directory
*/
search the directory cache for a matching entry;
if entry is found
{
    move entry to beginning of younger-older list;
}
else
{
    perform remote lookup, using dfs_lookup rpc;
    if result of the lookup is cachable
    {
        insert result into directory cache, at the
            beginning of the younger-older list;
    }
}
```

Figure 22:
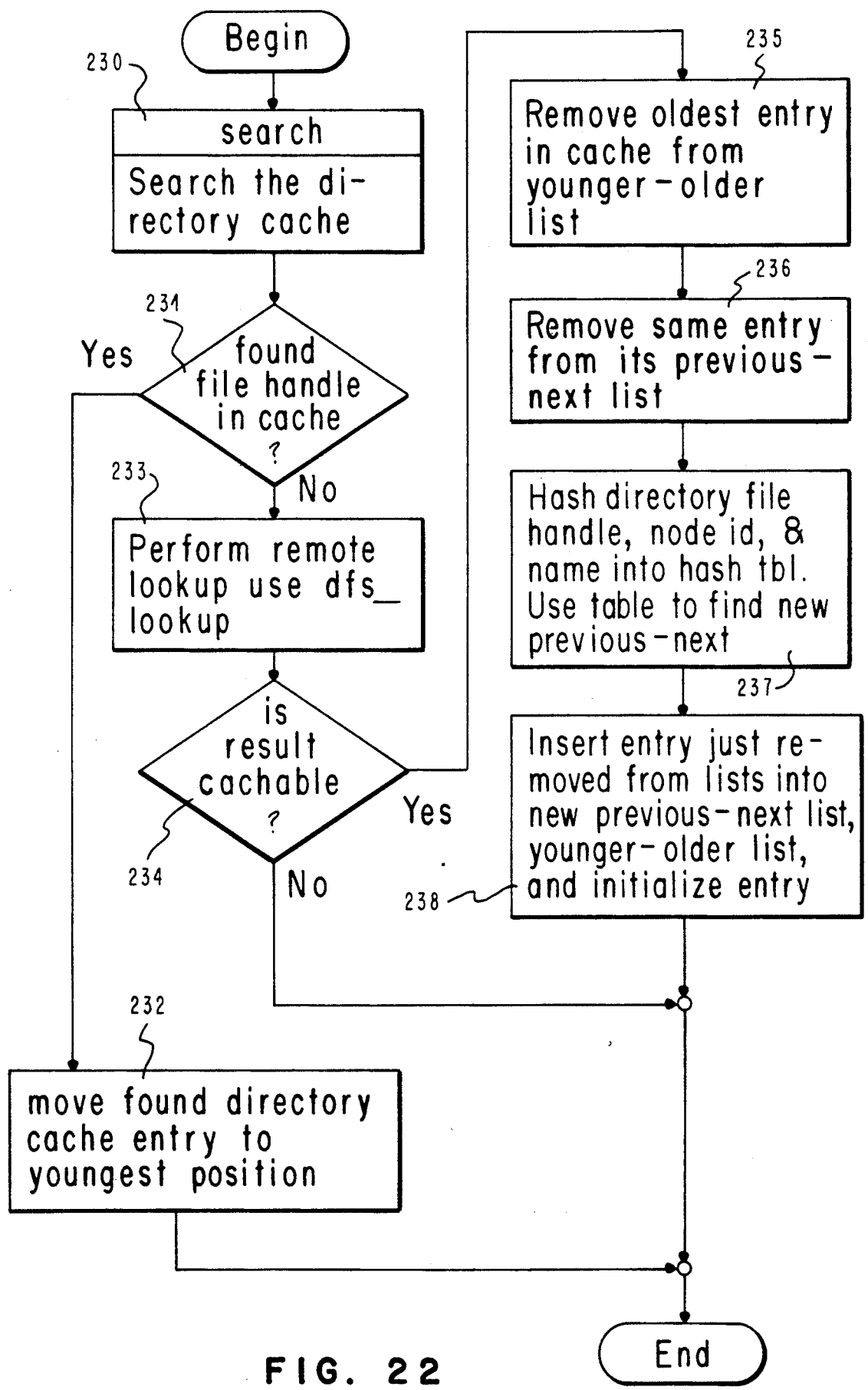
FIG. 22 is a detailed flow diagram of the client operations during a lookup of a file name in a remote directory in a system using the improved directory caching technique of this invention.

Referring now to FIG. 22, the detailed flow diagram of an operation at the client in performing operations necessary for the directory caching technique of this invention is shown. The operation depicted in FIG. 22 is executed each time a client must lookup a name in a remote directory.

At step 230 the directory cache is searched. This step is discussed in more detail below. The results of this search are tested at step 231. If the results indicate that the file handle for the name that was to be looked up in the remote directory was found then the operation proceeds to step 232. At step 232, the directory cache entry found in step 230 is moved to the front of the younger-older list. By moving an entry to the beginning of the list each time it is searched for, the most recently used entries tend to stay in the cache and the least recently used entries are the ones that are discarded. Moving an entry to the beginning of the younger-older list is easy because the list is doubly linked. After step 232 the operation ends.

If in step 231 it is determined that the search of step 230 failed, then the operation proceeds at step 233. At step 233, the operations necessary to perform a remote lookup are performed. At step 234, the results of the remote lookup, performed in step 233 are examined. If the results are not cachable, that is, the result is a file handle for an ordinary file, the operation ends.

If the file handle returned in step 233 is a directory file handle, step 234 will determine that the file handle is cachable and the operation will proceed with step 235. At step 235, the entry at the end of the younger-older list is removed. This is the least recently used or oldest entry in the cache. At step 236, remove this entry from its particular previous-next list. At step 237, hash the node id, directory file handle, and name values, originally used above during the search of step 230; use the result of this hashing to index into the directory cache hash table and find the previous-next list pointed to. At step 238, insert the entry obtained in step 235 in the previous-next list determined in step 237 and then initialize the entry with the node id, directory file handle, and the name values from set 230 and with the file handle returned by step 233. After step 238 the operation ends.

Operation (4), purging entries from the cache in response to a dfs_fs_advise rpc received at the client proceeds as follows:

```
/* upon receipt of a dfs_fs_advise rpc */
for each directory cache entry in the younger-
    older list
{
    if entry has the same node id as the node id
        of the dfs_fs_advise rpc's sender
    {
        remove the entry from the younger-older list;
        insert the entry at the end of the younger-older
            list;
        set the node id value in the entry to a node id
            of zero;
    }
}
```

No real node in an AIX TM system can have a node id of zero, so initializing a directory cache entry's node id to zero effectively prevents any successful matches with the entry during searches. By moving the entry to the end of the younger-older list, the entry becomes available for reuse when a new value is to be cached.

Figure 18:
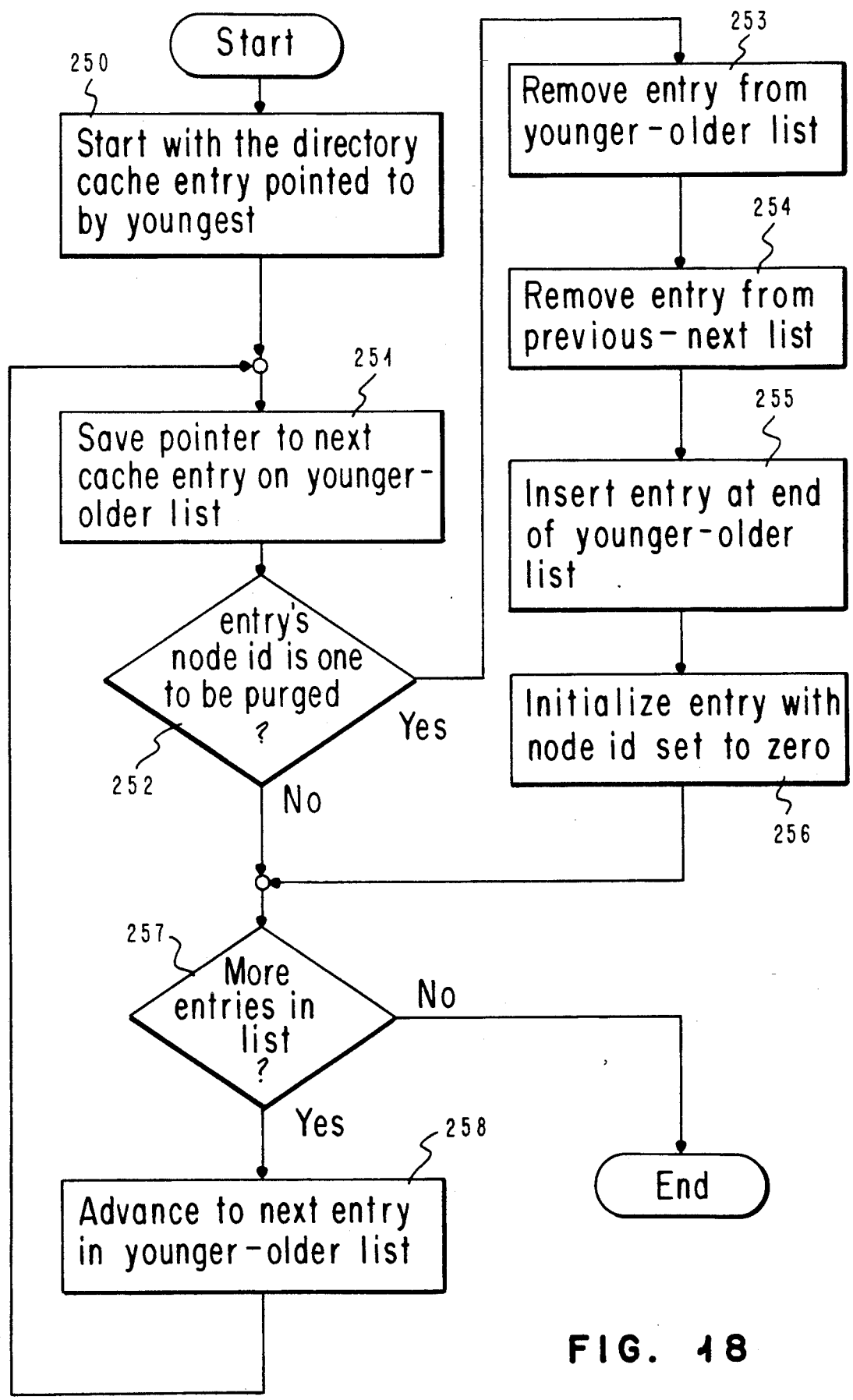
FIG. 18 is a detailed flow diagram which shows the operation at the client in response to a dfs_fs advise in a system using the improved directory caching technique of this invention.

Referring now to FIG. 18, the detailed flow diagram of operation (4) at the client in performing operations necessary for the directory caching techniques of this invention is shown. The operation depicted in FIG. 18 is executed each time the client receives a dfs_fs_advise rpc.

At step 250, the entry at the beginning of the younger-older list is found. It is pointed to by the pointer named youngest in FIG. 20. At step 251, the pointer to the next entry in the younger-older list is saved. At the end of the list this pointer will be null. At step 252, the entry is examined. If the node id of the entry is the same as the node id of the sender of the dfs_fs_advise rpc then proceed with steps 253, 254, 255, and 256, otherwise, if the node id is different proceed with step 257.

At step 253, remove the entry from the younger-older list. At step 254, remove the entry from the previous-next list to which it belongs. At step 255, insert the entry at the end of the younger-older list. At step 256, initialize the node id of the entry to zero. Steps 253, 254, 255, and 256 effectively remove the entry from the active cache elements and make the entry available for reuse. Of course, entries that find their way to the end of the younger-older list become available for reuse even if they are not placed there by this process. Because entries are moved to the beginning of the younger-older list each time they are searched for, only the least recently used entries make their way to the end of the list.

At step 257, the pointer saved in step 251 is examined. If it is a pointer to an entry the operation proceeds to step 258. At step 258 this entry becomes the current one under examination and the operation continues by reverting to step 251. If at step 257, the pointer saved in step 251 is null, the end of the list has been reached and the operation ends.

The operation (3), using the directory cache at the client during remote lookup requires searching of the directory cache. Such searching proceeds as follows:

```
/* Searching starts with a vnode pointer to a
    directory, a node id for the node containing the
    directory, and a name, which is a piece of a
    pathname.
*/
convert the vnode ptr to the directory to a file
    handle; the file handle is in the surrogate
    inode which is pointed to by a member of the
    vnode structure which is pointed to by the vnode
    pointer;
hash into the directory cache hash table using the
    node id, directory file handle, and name;
for each entry on the previous-next list pointed to
    by the hash table element indexed by the computed
    hash
{
    if node id, directory file handle, and name in
        the entry match those to be searched for
    {
        return file handle found in the entry
    }
}
/* at this point no match was found, so there is no
    match in the cache
*/
return not found
```

Figure 23:
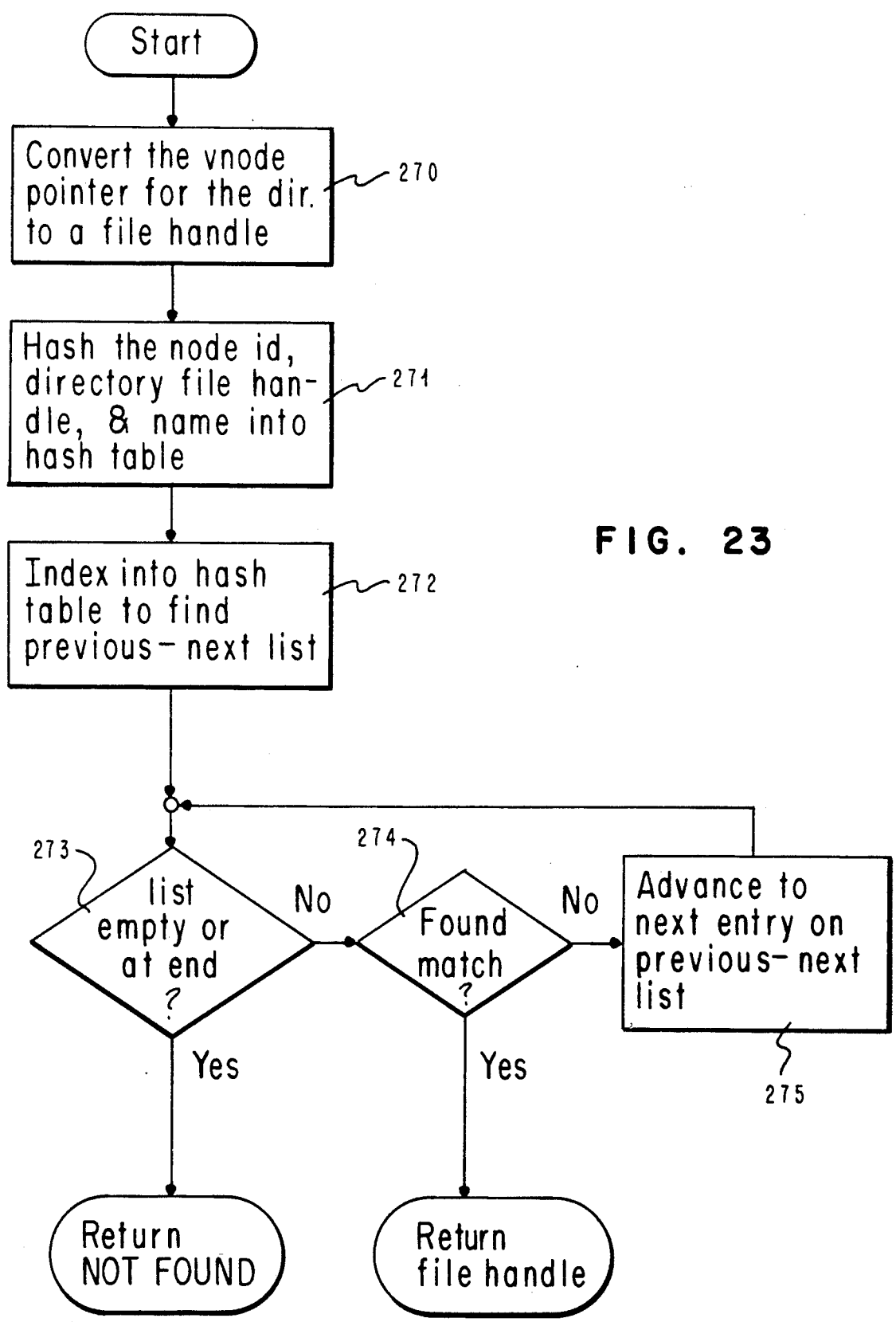
FIG. 23 is a detailed flow diagram of the directory cache search operation of this invention.

Referring now to FIG. 23, the detailed flow diagram of the search operation necessary for the directory caching techniques of this invention is shown. The operation of FIG. 23 is performed each time the operation of FIG. 22, step 230 is performed.

This operation starts with a node id, a vnode pointer to a directory, and a name (a part of a pathname). At step 270, the vnode pointer to a directory is converted to a file handle. This is done by examining the structure pointed to by the vnode pointer. The file handle is in the surrogate inode which is pointed to by a member of the vnode structure which is pointed to by the vnode pointer. At step 271, the node id, directory file handle determined in step 270, and the name are hashed. At step 272, this hash value is used to index into the directory cache hash table to obtain a pointer to one of the previous-next lists. If no previous-next list exists for this particular hash value, the value found in the hash table will be null.

At step 273, the pointer found in step 272 or in subsequent iterations found in step 275 is examined to determine if all entries have been processed. If all entries have been processed. The operation ends with an indication that no matching cache entry was found. If there is at least one more'entry to process, i.e. the pointer is not null, proceed with step 274.

At step 274, the entry is examined. If its node id, directory file handle, and name fields match those of the search request that were used in step 271, the operation end, returning the file handle found in the entry. If there is no match the operation proceeds with step 275. At step 275, a pointer to the next entry to examine is obtained from the current entry's field named next. Of course, at the end of the list there is no next entry. This will be determined in the next step, step 273.

Files are frequently renamed and deleted. In the method just described, servers would be required to send dfs_fs_advise rpcs to all clients caching directory entries each time one of these common operations occured. This would not allow client nodes to benefit from cached information for very long. An enhancement of the method so far described eliminates this problem.

The enhancement is caching only directory file handles at clients and not non-directory (ordinary) file handles. Non-directory files are frequently deleted or renamed, but directory files are infrequently deleted or renamed. By caching only directory file names at clients and sending fs_advise messages to clients only when server directories are deleted or renamed, clients can benefit from their cached information for longer intervals before invalidation of their cached data happens. For example, when following the pathname "/a/b/c" to a file, a client would cache "a" with its associated file handle and "b" with its associated file handle but would not cache "c" with its associated file handle. There is the negative effect of not being to cache the last component of any pathname that names an ordinary file.

Notice that the Node Table information at the server can be kept at a finer granularity. An enhancement would be to keep in the Node Table at the server a list of directories for each client that the client might be caching entries from. Then a change to a directory in a server would cause dfs_fs_advise rpcs to be sent to the clients that are possibly caching the changed directory's entries, and the dfs_fs_advise at the client would cause only the cache entries for the changed directory to be purged, not all of the entries for that server.

While the invention has been described in terms of a preferred embodiment in a specific operating system environment, those skilled in the art will recognize that the invention can be practiced, with modification, in other and different operating systems within the spirit and scope of the appended claims.

We claim:

1. A directory caching method for a network of data processing systems comprising:

saving, at a first system, a first unit of directory information about a second system in response to an inquiry by said first system regarding a directory structure of said second system;

automatically sensing a first notification from said second system to said first system in response to a subsequent change in said directory structure of said second system, wherein said first notification instructs said first system to erase said first unit of directory information;

detecting an inhibiting condition associated with said network of data processing systems, wherein said inhibiting condition is a saturation of second system process resources; and automatically sending a second notification from said second system to said first system to erase said first unit of directory information in response to said inhibiting condition.

2. A directory caching method for a network of data processing systems comprising:

saving, at a first system, a first unit of directory information about a second system in response to an inquiry by said first system regarding a directory structure of said second system;

automatically sending a first notification from said second system to said first system in response to a subsequent change in said directory structure of said second system, wherein said first notification instructs said first system to erase said first unit of directory information;

detecting an inhibiting condition associated with said network of data processing systems, wherein said inhibiting condition is a saturation of process resources available for the task of automatically sending said notifications; and automatically sending a second notification from said second system to said first system to erase said first unit of directory information in response to said inhibiting condition.

3. A directory caching method for a network of data processing systems comprising:

saving, at a first system, a first unit of directory information about a second system in response to an inquiry by said first system regarding a directory structure of said second system;

automatically sending a first notification from said second system to said first system in response to a subsequent change in said directory structure of said second system, wherein said first notification instructs said first system to erase said first unit of directory information;

detecting an inhibiting condition associated with said network of data processing systems, wherein said inhibiting condition is an unavailability of communications resource between said second and first systems; and automatically sending a second notification from said second system to said first system to erase said first unit of directory information in response to said inhibiting condition.

4. A directory caching method for a network of data processing systems comprising:

saving, at a first system, a first unit of directory information about a second system in response to an inquiry by said first system regarding a directory structure of said second system;

automatically sending a first notification from said second system to said first system in response to a subsequent change in said directory structure of said second system, wherein said first notification instructs said first system to erase said first unit of directory information;

detecting an inhibiting condition associated with said network of data processing systems, wherein said inhibiting condition is a lack of a recent inquiry from said first system to said second system regarding additional directory information; and automatically sending a second notification from said second system to said first system to erase said first unit of directory information in response to said inhibiting condition.

5. A directory caching method for a network of data processing systems comprising:

saving, at a first system, a first unit of directory information about a second system in response to an inquiry by said first system regarding a directory structure of said second system;

automatically sending a first notification from said second system to said first system in response to a subsequent change in said directory structure of said second system;

detecting an inhibiting condition associated with said network of data processing systems;

automatically sending a third notification from said second system to a third system in response to a previous inquiry by said third system of a directory structure of said second system and a subsequent change in the directory structure of said second system; and automatically sending a fourth notification from said second system to said first system that said second system is unable to send further additional units of directory information in response to said condition and when said inquiry by said third system was more recent than said inquiry by said first system.

6. A directory caching method for a network of data processing systems comprising:

saving, at a first system, a first unit of directory information about a second system in response to an inquiry by said first system regarding a directory structure of said second system;

automatically ending an additional unit of directory information from said second system to said first system in response to a subsequent change in said directory structure of said second system;

detecting an inhibiting condition associated with said network of data processing systems, wherein said inhibiting condition is a saturation of second system process resources; and automatically sending a first notification from said second system to said first system that said second system is unable to send further additional units of directory information in response to said inhibiting condition.

7. A directory caching method for a network of data processing systems comprising:

saving, at a first system, a first unit of directory information about a second system in response to an inquiry by said first system regarding a directory structure of said second system;

automatically sensing an additional unit of directory information from said second system to said first system in response to a subsequent change in said directory structure of said second system;

detecting an inhibiting condition associated with said network of data processing systems, wherein said inhibiting condition is an unavailability of memory at said second system for storing said additional units of directory information for sensing; and automatically sending a first notification from said second system to said first system that said second system is unable to send further additional units of directory information in response to said inhibiting condition.

8. A directory caching method for a network of data processing systems comprising:

saving, at a first system, a first unit of directory information about a second system in response to an inquiry by said first system regarding a directory structure of said second system;

automatically sensing an additional unit of directory information from said second system to said first system in response to a subsequent change in said directory structure of said second systems;

detecting an inhibiting condition associated with said network of data processing systems, wherein said inhibiting condition is an unavailability of communications resources between said second and first systems; and automatically sending a first notification from said second system to said first system that said second system is unable to send further additional units of directory information in response to said inhibiting condition.

* * * * *

UNITED STATES PATENT AND TRADEMARK OFFICE
CERTIFICATE OF CORRECTION

PATENT NO. : 5,151,989

DATED : September 29, 1992

INVENTOR(S) : D. W. Johnson et al

It is certified that error appears in the above-identified patent and that said Letters Patent is hereby corrected as shown below:

Title page, item [57], col. 2,

In the Abstract, line 7, delete "director" and insert --directory--;

Col. 2, line 35, after "files" insert --.--;

Col. 10, line 10, after "file" insert --system.--;

Col. 18, line 41, insert immediately after the bold underscore beginning the table --if entry is being removed or renamed--;

line 38, please delete "if entry";

line 39, please delete "is being removed or renamed";

Col. 19, line 35, please delete "perform the lookup request, requested by some";

line 36, please delete "client; if result is a file handle for a directory";

line 39, immediately after the bold underscore beginning the table insert --perform the lookup request, requsted by some client;--;

line 40, immediately following the above insert at line 39, insert --if result is a file handle for a directory--;

Col. 23, line 43, delete "sensing" and insert --sending--;

Col. 25, line 16, delete "ending" and insert --sending--;

Col. 26, line 1, delete "sensing" and insert --sending--;

line 9, delete "sensing" and insert --sending--;

line 21, delete "sensing" and insert --sending--; and

UNITED STATES PATENT AND TRADEMARK OFFICE
CERTIFICATE OF CORRECTION

PATENT NO. : 5,151,989
DATED : September 29, 1992
INVENTOR(S) : D. W. Johnson, et. al.

It is certified that error appears in the above-indentified patent and that said Letters Patent is hereby corrected as shown below:

Col. 26, line 24, delete "systems" and insert --system--.

Signed and Sealed this

Twenty-fourth Day of October, 1995

BRUCE LEHMAN

*Attesting Officer*     *Commissioner of Patents and Trademarks*